(12) United States Patent
Wang et al.

(10) Patent No.: US 11,877,047 B2
(45) Date of Patent: Jan. 16, 2024

(54) ELECTRONIC DEVICE AND METHOD FOR DETERMINING A POSITION STATE OF A CAMERA

(71) Applicant: Honor Device Co., Ltd., Guangdong (CN)

(72) Inventors: Xing Wang, Shenzhen (CN); Lei Ma, Shenzhen (CN); Beihang Zhang, Shenzhen (CN); Hongda Chen, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 299 days.

(21) Appl. No.: 17/442,777

(22) PCT Filed: Mar. 27, 2020

(86) PCT No.: PCT/CN2020/081673
§ 371 (c)(1),
(2) Date: Sep. 24, 2021

(87) PCT Pub. No.: WO2020/200089
PCT Pub. Date: Oct. 8, 2020

(65) Prior Publication Data
US 2022/0174198 A1    Jun. 2, 2022

(30) Foreign Application Priority Data

Mar. 29, 2019   (CN) .......................... 201910249922.9

(51) Int. Cl.
*H04N 23/60*   (2023.01)
*G01D 5/14*    (2006.01)
(Continued)

(52) U.S. Cl.
CPC ............. *H04N 23/60* (2023.01); *G01D 5/145* (2013.01); *H04M 1/0264* (2013.01);
(Continued)

(58) Field of Classification Search
CPC ........ H04N 23/60; H04N 23/51; H04N 23/54; H04N 23/57; G01D 5/145; H04M 1/0264; H04M 1/0235; H04M 2250/12
(Continued)

(56) References Cited

U.S. PATENT DOCUMENTS 7,132,824 B2   11/2006   Masuda et al.
7,860,538 B2   12/2010   Won et al.
(Continued)

FOREIGN PATENT DOCUMENTS

CN   103782135 A   5/2014
CN   104023105 A   9/2014
(Continued)

OTHER PUBLICATIONS

Liao Ying et al., "Magnet field tracking system in vitro based on the Hall effect sensors array," Beijing Biomedical Engineering, vol. 31, No. 5, pp. 501-506 (Oct. 2012).

*Primary Examiner* — Usman A Khan
(74) *Attorney, Agent, or Firm* — Leydig, Voit & Mayer, Ltd.

(57) ABSTRACT

An electronic device includes a camera and a position detection component arranged in an accommodating cavity. The position detection component includes a circuit board, a bracket, a first magnet, and a Hall sensor. The camera of the electronic device is arranged on the bracket, and the camera can stretch out of or retract into the accommodating cavity constituted by a housing. The Hall sensor includes a first working surface and a second working surface which respectively extend in different directions. The Hall sensor senses a magnetic field of the first magnet through the first working surface and the second working surface and gen-
(Continued)

erates induction signals. The induction signals are used to determine a stretching-out position and a retracting position of the camera.

18 Claims, 18 Drawing Sheets

(51) Int. Cl.
    *H04M 1/02*     (2006.01)
    *H04N 23/51*     (2023.01)
    *H04N 23/54*     (2023.01)
    *H04N 23/57*     (2023.01)

(52) U.S. Cl.
    CPC ............ *H04N 23/51* (2023.01); *H04N 23/54* (2023.01); *H04N 23/57* (2023.01)

(58) Field of Classification Search
    USPC ........................................................ 348/376
    See application file for complete search history.

(56) References Cited

U.S. PATENT DOCUMENTS

| | | | |
|---|---|---|---|
| 8,531,181 | B2 | 9/2013 | Aebi et al. |
| 9,086,299 | B2 | 7/2015 | Sanchez |
| 9,523,744 | B2 | 12/2016 | Kim |
| 9,716,459 | B2 | 7/2017 | Hanaka et al. |
| 9,841,295 | B2 | 12/2017 | Kernebeck |
| 10,404,143 | B2 | 9/2019 | Chen et al. |
| 10,557,723 | B2 | 2/2020 | Lee et al. |
| 11,463,566 | B2 | 10/2022 | Lei et al. |
| 2005/0258825 | A1 | 11/2005 | Masuda et al. |
| 2006/0256209 | A1 | 11/2006 | Yoshida et al. |
| 2009/0226157 | A1 | 9/2009 | Uenaka |
| 2015/0113752 | A1* | 4/2015 | Lv .............................. A47L 1/02 15/250.001 |
| 2015/0177477 | A1* | 6/2015 | Hubert ................. G02B 13/001 29/825 |
| 2017/0142307 | A1 | 5/2017 | Kim |
| 2017/0318201 | A1 | 11/2017 | Evans, V et al. |
| 2020/0213491 | A1 | 7/2020 | Huang et al. |
| 2022/0174198 | A1 | 6/2022 | Wang et al. |

FOREIGN PATENT DOCUMENTS

| | | | | |
|---|---|---|---|---|
| CN | 104697431 A | 6/2015 | | |
| CN | 104902171 A | 9/2015 | | |
| CN | 104980538 A | 10/2015 | | |
| CN | 105122008 A | 12/2015 | | |
| CN | 107197133 A | 9/2017 | | |
| CN | 107819907 A | 3/2018 | | |
| CN | 108120456 A | 6/2018 | | |
| CN | 108495039 A | 9/2018 | | |
| CN | 108696679 A | 10/2018 | | |
| CN | 207995139 U | 10/2018 | | |
| CN | 108758232 A | 11/2018 | | |
| CN | 108965660 A | 12/2018 | | |
| CN | 108965660 A | * 12/2018 | .......... H04M 1/0264 |
| CN | 109040367 A | 12/2018 | | |
| CN | 109348094 A | 2/2019 | | |
| CN | 109951702 A | 6/2019 | | |
| CN | 209659486 U | 11/2019 | | |
| EP | 3654631 A1 | 5/2020 | | |
| EP | 3654631 A1 | * 5/2020 | ............. G03B 17/04 |
| JP | 2001169156 A | 6/2001 | | |
| JP | 2005331399 A | 12/2005 | | |
| JP | 2006317191 A | 11/2006 | | |
| JP | 2010107440 A | 5/2010 | | |
| JP | 2010286401 A | 12/2010 | | |
| JP | 201740621 A | 2/2017 | | |
| KR | 1020080020265 A | 3/2008 | | |
| RU | 2331132 C1 | 8/2008 | | |
| WO | 2009121193 A1 | 10/2009 | | |
| WO | 2017071362 A1 | 5/2017 | | |
| WO | 2019184978 A1 | 10/2019 | | |

* cited by examiner

ELECTRONIC DEVICE AND METHOD FOR DETERMINING A POSITION STATE OF A CAMERA

This application is a national stage of International Application No. PCT/CN2020/081673, filed on Mar. 27, 2020, which claims priority to Chinese Patent Application No. 201910249922.9, filed on Mar. 29, 2019, the disclosures of which are incorporated herein by reference in their entireties.

TECHNICAL FIELD

This application relates to the field of communications technologies, and in particular, to a position detection mechanism, a mobile terminal, and a position detection method in a communications product.

BACKGROUND

With the development and progress of science and technology, position detection mechanisms (for example, position detection components of retractable cameras, and position detection components of retractable gastroscope probes) have been widely used. For example, to resolve the problem that a front camera device occupies a display area, a retractable camera assembly can be arranged for the mobile terminal. The retractable camera component may include a camera device and a motor for driving the camera device to move. The camera device of the retractable camera assembly can stretch out of the mobile terminal when shooting is needed, and retract into the accommodation space in the mobile terminal when shooting is not needed.

However, how to accurately detect the position of the camera device (that is, the telescopic position and the telescopic state of the camera) to ensure a better shooting effect and protect the camera device is a goal that the industry has been pursuing.

SUMMARY

Embodiments of this application disclose a position detection mechanism, a mobile terminal, and a position detection method that can improve detection accuracy.

According to a first aspect, an embodiment of this application discloses a position detection mechanism, including: a first body; a second body, which is spaced apart from the first body and can move relative to the first body; a first magnet, which is arranged on the second body; and a Hall sensor, which is arranged on the first body and includes a first working surface and a second working surface respectively extending in different directions, where the Hall sensor senses a magnetic field of the first magnet through the first working surface and generates a first induction signal, and the Hall sensor further senses the magnetic field of the first magnet through the second working surface and generates a second induction signal; the first induction signal and the second induction signal are used to determine a position state of the second body. The position state of the second body includes a first position state in which the second body moves to a first preset position in a first direction, and a second position state in which the second body moves to a second preset position in a second direction. The second direction is opposite to the first direction.

The working surface refers to a magnetic sensing surface of the Hall sensor. In the position detection mechanism disclosed in this embodiment of this application, because the Hall sensor includes the first working surface and the second working surface, the Hall sensor can sense the magnetic field of the first magnet through the first working surface and generate the first induction signal, and the Hall sensor further senses the magnetic field of the first magnet through the second working surface and generates the second induction signal, so that when the second body moves relative to the first body, the position state of the second body can be determined based on the two induction signals (the first induction signal and the second induction signal) output by the Hall sensor. That is, the position state of the second body is determined only when both of the two signals meet a condition, thereby improving the detection accuracy.

To sense the magnetic field generated by the first magnet to a greater extent, and to further improve the detection accuracy, moving directions of the first working surface and the second body are substantially perpendicular. The second working surface is substantially perpendicular to the first working surface, and both the first working surface and the second working surface are substantially perpendicular to a surface of the first body on which the Hall sensor is arranged. "Approximately perpendicular" may be interpreted as being vertical, being approximately vertical, or having a specific preset angle.

In some embodiments, to be able to detect interference of an external magnetic field, the Hall sensor further includes a third working surface whose extension direction is different from extension directions of both the first working surface and the second working surface. The Hall sensor senses the magnetic field of the first magnet and/or the external magnetic field through the third working surface and generates a third induction signal. The third induction signal is used to determine whether the position detection mechanism is interfered by the external magnetic field. The external magnetic field is a magnetic field generated by an object other than the first magnet and the second magnet described below.

When there is no external magnetic field, the third induction signal generated by the Hall sensor does not change; and when there is an external magnetic field, the third induction signal generated by the Hall sensor changes. Alternatively, when there is no external magnetic field, the third induction signal generated by the Hall sensor is 0; and when there is an external magnetic field, the third induction signal generated by the Hall sensor is not 0.

In an embodiment, to reduce the interference of the existing magnetic field and improve the accuracy of sensing the external magnetic field, the third working surface is substantially perpendicular to the first working surface and the second working surface separately.

To improve the detection accuracy of the position state of the second body, the position detection mechanism further includes a second magnet. The second magnet and the first magnet are spaced apart on the second body. The Hall sensor senses the magnetic field of the first magnet and/or the second magnet through the first working surface and generates the first induction signal, and the Hall sensor further senses the magnetic field of the first magnet and/or the second magnet through the second working surface and generates the second induction signal. In this embodiment, because the first induction signal and the second induction signal are generated by sensing at least one of the two magnets, when the second body is moving, the first induction signal and the second induction signal have a relatively high change rate. Further, a moving position of the second body can be determined based on different first induction signals and second induction signals, thereby improving the accuracy of detecting the position state of the second body.

When the second body moves relative to the first body, the first magnet and the second magnet move relative to the Hall sensor. However, regardless of a position to which the second body moves relative to the first body, the Hall sensor is always located within ranges of the magnetic fields generated by the first magnet and the second magnet, so as to ensure stability of generating the first induction signal and the second induction signal by the Hall sensor.

In an embodiment, the magnetic field generated by the first magnet and the magnetic field generated by the second magnet at least partially overlap, so that when the second body moves relative to the first body, a magnetic flux sensed by the first working surface and the second working surface greatly changes. This can improve sensitivity of the Hall sensor to sense the magnetic field, thereby improving the accuracy of detecting the state of the first body.

In this embodiment, the first magnet and the second magnet are both bar magnets to facilitate control in the production process and foolproofness during production line processing. In another embodiment, the first magnet and the second magnet may alternatively be cylindrical magnets with a semicircular cross section.

In an embodiment, to ensure a positional relationship between the Hall sensor and the first magnet and the second magnet when the second body moves, and further ensure that the Hall sensor can sense the magnetic fields generated by the first magnet and the second magnet, a connection line between the center point of the first magnet and the center point of the second magnet is substantially parallel to the moving direction of the second body. The center point refers to the center of gravity of the element. When an element is a regular object, the center point of the element is the geometric center of the regular object. "Substantially parallel" may be interpreted as being parallel, being approximately parallel, or having a specific preset angle.

In an embodiment, the north-south axis of the first magnet and the north-south axis of the second magnet are substantially parallel to the moving direction of the second body separately, so that during the movement of the second body, the Hall sensor can sense a superimposed magnetic field generated by the first magnet and the second magnet.

In addition, to ensure the detection sensitivity of the Hall sensor and ensure that a change rate of the magnetic flux passing through the first working surface and the second working surface meets a specific requirement, adjacent ends of the first magnet and the second magnet have the same polarity. In an embodiment, the magnetic pole with the same name is an N pole. The north-south axis is a vector of the magnet from the N pole to the S pole, that is, the direction of the magnetic pole. The most magnetic part of the magnet is referred to as the magnetic pole. A magnet that rotates freely in a horizontal plane always has one magnetic pole pointing to the south and the other magnetic pole pointing to the north when the magnet is stationary. The magnetic pole pointing to the south is referred to as the south pole (S pole), and the magnetic pole pointing to the north is referred to as the north pole (N pole).

According to the second aspect, an embodiment of this application discloses a mobile terminal, including a display screen, a housing, and a camera device. The display screen is mounted on the housing. The housing is provided with an opening and is formed with an accommodating cavity in communication with the opening to accommodate the camera device. The mobile terminal further includes a position detection mechanism arranged in the accommodating cavity.

The position detection mechanism includes a circuit board, a bracket, a first magnet, and a Hall sensor. The camera device includes a camera and a driving assembly. The camera is arranged on the bracket, and the driving assembly is connected to the bracket for driving the bracket to move to drive the camera to stretch out of or retract into the housing. The Hall sensor includes a first working surface and a second working surface respectively extending in different directions. The Hall sensor senses a magnetic field of the first magnet through the first working surface and generates a first induction signal, and the Hall sensor further senses the magnetic field of the first magnet through the second working surface and generates a second induction signal. The first induction signal and the second induction signal are used to determine a position state of the camera. The position state of the camera includes a retracting position and a stretching-out position.

Because the mobile terminal disclosed in this embodiment of this application includes the position detection mechanism in the foregoing embodiment, and the camera is arranged on the bracket, the position state of the camera can be determined by using the first induction signal and the second induction signal generated by the Hall sensor, so as to improve the accuracy of detecting the position state of the camera.

In an embodiment, the driving assembly includes a driving member, an adapter, and a lead screw. One end of the adapter is fixedly connected to the bracket, and the other end of the adapter is rotatably connected to the lead screw. the lead screw is further rotatably connected to the driving member. The driving member can drive the lead screw to rotate, so that the adapter drives the bracket to move, and the camera stretches out of or retracts into the housing from the opening. In this embodiment, the lead screw is configured to drive the bracket to move, thereby effectively improving the movement accuracy of the bracket and improving the operation reliability of the mobile terminal.

In an embodiment, the Hall sensor is arranged on a side of the circuit board facing the display screen, and the camera is arranged on a side of the bracket facing the display screen. Moving directions of the first working surface and the bracket are substantially perpendicular. The second working surface and the first working surface are substantially perpendicular, and the first working surface and the second working surface are both substantially perpendicular to a surface of the circuit board facing the display screen.

In an embodiment, the Hall sensor further includes a third working surface whose extension direction is different from extension directions of both the first working surface and the second working surface. The Hall sensor senses the magnetic field of the first magnet and/or the external magnetic field through the third working surface and generates a third induction signal. The third induction signal is used to determine whether the mobile terminal is interfered by the external magnetic field.

In an embodiment, the third working surface is substantially parallel to the surface of the circuit board facing the display screen.

In addition, the position detection mechanism in the mobile terminal may alternatively be the position detection mechanism in any one of the foregoing embodiments in the first aspect.

To control the driving assembly based on the first induction signal and the second induction signal generated by the Hall sensor, in some embodiments, the mobile terminal further includes a processor. The processor is electrically connected to the driving assembly and the Hall sensor. When receiving a trigger operation input by a user, the processor controls the driving assembly to work, so as to drive the bracket to move, thereby driving the camera to stretch out of or retract into the housing from the opening. The processor further obtains the first induction signal and the second induction signal sent by the Hall sensor, and determines the position state of the camera based on the obtained first induction signal and second induction signal.

The state of the camera includes: a retracting position, a stretching-out position, a retracting process, or a stretching-out process. The "retracting position" here means that the camera is located in the accommodating cavity of the mobile terminal. The "stretching-out position" here means that the camera stretches out of the accommodating cavity of the mobile terminal and is located outside the accommodating cavity. The "retracting process" here is a process in which the camera retracts from the outside of the accommodating cavity into the accommodating cavity. The "stretching-out process" here is a process in which the camera stretches out from the accommodating cavity to the outside of the accommodating cavity.

To improve the accuracy of detecting the state of the camera, the mobile terminal is preset with a reference signal. In this way, the state of the camera can be accurately determined by comparing the first induction signal and the second induction signal with the preset reference signal. Therefore, in some embodiments, that the processor obtains the first induction signal and the second induction signal sent by the Hall sensor, and determines the state of the camera based on the obtained first induction signal and second induction signal includes: the processor obtains the first induction signal and the second induction signal sent by the Hall sensor, and determines whether the first induction signal and the second induction signal change continuously. When the first induction signal and the second induction signal no longer change, the processor respectively calculates a difference between the first induction signal and a first reference signal, and a difference between the second induction signal and a second reference signal. The first reference signal and the second reference signal are respectively the induction signals generated by the first working surface and the second working surface of the Hall sensor when the camera is in the stretching-out position. Alternatively, the first reference signal and the second reference signal are respectively the induction signals generated by the first working surface and the second working surface of the Hall sensor when the camera is in the retracting position. The processor further determines whether an absolute value of the difference is less than a preset threshold. When the absolute value of the difference is less than the preset threshold, the processor determines that the camera is in the stretching-out position or in the retracting position. When the first induction signal and the second induction signal change continuously, the processor determines that the camera is in the stretching-out process or the retracting process.

To avoid the presence of a magnetic field in the process of detecting the position of the camera and avoid affecting the detection accuracy, in some embodiments, when the first induction signal and the second induction signal no longer change, the processor further obtains a third induction signal generated by the third working surface of the Hall sensor, and calculates a difference between the obtained third induction signal and a steady-state signal. The processor further determines whether an absolute value of the difference is greater than a reference threshold. The processor respectively calculates the difference between the first induction signal and the first reference signal, and the difference between the second induction signal and the second reference signal only when the absolute value of the difference is not greater than the reference threshold. In this way, the impact of the external magnetic field on the calculation accuracy can be eliminated.

The steady-state signal is an induction signal generated by the third working surface of the Hall sensor in an environment in which the mobile terminal is not subject to an external magnetic field.

When interference of the external magnetic field exists, there is an error in the position detection of the camera, so the position detection makes no sense. Therefore, in an embodiment, when an amount of change of the third induction signal in comparison with the steady-state signal is greater than the reference threshold, the mobile terminal is controlled to send prompt information to prompt the user to stay away from the magnetic field.

In an embodiment, to accurately determine whether the camera is in the stretching-out position, the trigger operation input by the user includes a trigger operation for starting the camera; the first reference signal includes a first stretching-out reference signal, and the second reference signal includes a second stretching-out reference signal; and the preset threshold includes a first preset threshold. The first stretching-out reference signal and the second stretching-out reference signal are respectively the induction signals generated by the first working surface and the second working surface of the Hall sensor when the camera is in the stretching-out position. When receiving the trigger operation input by the user for starting the camera, the processor controls the driving assembly to work, so as to drive the second body to move in the first direction, so that the camera is in the stretching-out process. The processor further obtains the first induction signal and the second induction signal sent by the Hall sensor when the camera is in the stretching-out process, and determines whether the first induction signal and the second induction signal change continuously. When the first induction signal and the second induction signal no longer change, the processor respectively calculates the difference between the first induction signal and the first stretching-out reference signal, and the difference between the second induction signal and the second stretching-out reference signal. The processor further determines whether the absolute value of the difference is less than the first preset threshold. When the absolute value of the difference is less than the first preset threshold, the processor determines that the camera is in the stretching-out position.

In addition, to accurately determine whether the camera is in the retracting position, the trigger operation input by the user further includes a trigger operation for turning off the camera; the first reference signal includes a first retracting reference signal, and the second reference signal includes a second retracting reference signal; and the preset threshold includes a second preset threshold. The first retracting reference signal and the second retracting reference signal are respectively the induction signals generated by the first working surface and the second working surface of the Hall sensor when the camera is in the retracting position. When receiving the trigger operation input by the user for turning off the camera, the processor controls the driving assembly to work, so as to drive the second body to move in the second direction, so that the camera is in the retracting process. The processor further obtains the first induction signal and the second induction signal sent by the Hall sensor when the camera is in the retracting process, and determines whether the first induction signal and the second induction signal change continuously. When the first induction signal and the second induction signal no longer change, the processor respectively calculates the difference between the first induction signal and the first retracting reference signal, and the difference between the second induction signal and the second retracting reference signal. The processor further determines whether the absolute value of the difference is less than the second preset threshold. When the absolute value of the difference is less than the second preset threshold, the processor determines that the camera is in the retracting position.

When the absolute value of the difference is not less than the first preset threshold, it indicates that the camera does not fully stretch out of the housing. In this case, a possible reason is that the bracket is hindered during the movement, for example, resistance to the movement of the bracket is greater than a driving force of the driving member, and consequently the bracket stops moving in the movement process. Another possible reason is that a specific structure of the mobile terminal is faulty. In this case, if the driving member continues to work, the driving assembly and the bracket may be damaged. Therefore, to avoid this situation, in some embodiments, the processor controls the driving assembly to continue to work, so as to drive the bracket to continue to move in the first direction, and determines whether the camera is in the stretching-out position. When the camera is still not in the stretching-out position, the processor controls the driving assembly to drive the bracket to move in the second direction, so as to drive the camera to retract into the housing, thereby protecting the bracket and the driving assembly.

Likewise, when the absolute value of the difference is not less than the second preset threshold, the processor controls the driving assembly to continue to work, so as to drive the bracket to continue to move in the second direction, and determines whether the camera is in the retracting position. When the camera is still not in the retracting position, the processor controls the driving assembly to stop working.

When it is determined that the camera is in the stretching-out position, if the processor does not receive a trigger operation of the user for turning off the camera, the camera should be always in the stretching-out position, that is, the bracket is in the first preset position and does not move. However, when the camera receives external pressure, for example, when the user wants to manually press the camera to make the camera retract into the housing, if the driving member is still not working in this case, a service life of the driving member is affected, or even the driving member is damaged. Therefore, to avoid this situation, in some embodiments, when determining that the camera is in the stretching-out position, the processor further obtains the first induction signal and the second induction signal sent by the Hall sensor when the camera is in the stretching-out position, and determines whether the first induction signal and the second induction signal change. When the first induction signal and the second induction signal change, the processor determines whether an amount of the change of the first induction signal and the second induction signal is greater than a third preset threshold. When the amount of the change of the first induction signal and the second induction signal is greater than the third preset threshold, the processor controls the driving assembly to drive the bracket to move in the second direction, so that the camera retracts into the housing.

However, the change of the first induction signal and the second induction signal may not be caused by the movement of the bracket resulting from the external pressure on the camera. It is possible that interference of the external magnetic field exists. Therefore, when the camera is in the stretching-out position, and the first induction signal and the second induction signal output by the Hall sensor change, it is further necessary to determine whether interference of the external magnetic field exists, so as to avoid incorrect determining and further avoid affecting user experience. For example, when the user is using the camera to take a photo, in this case, if it is detected that the first induction signal and the second induction signal output by the Hall sensor change, and the camera is controlled to retract, the user's photo taking is interrupted, causing poor user experience.

Therefore, in some embodiments, before the processor controls the driving assembly to work, so as to drive the bracket to move in the second direction, so that the camera retracts into the housing, the processor further obtains the third induction signal sent by the Hall sensor when the camera is in the stretching-out position, and calculates a difference between the obtained third induction signal and a steady-state signal. The steady-state signal is an induction signal generated by the third working surface of the Hall sensor in an environment in which the mobile terminal is not subject to an external magnetic field. The processor further determines whether an absolute value of the difference is greater than a fourth preset threshold. When the absolute value of the difference is not greater than the fourth preset threshold, the processor controls the driving assembly to drive the bracket to move in the second direction, so that the camera retracts into the housing.

In an embodiment, when the absolute value of the difference is greater than the fourth preset threshold, the processor further controls the mobile terminal to send prompt information to prompt the user to stay away from the external magnet.

In addition, when determining that the camera successfully stretches out and is in the stretching-out position, or the camera successfully retracts and is in the retracting position, the processor further separately records a quantity of times the camera successfully stretches out or successfully retracts, so as to indicate the current state of the camera.

According to a third aspect, an embodiment of this application discloses a position detection method, which is applied to a mobile terminal. The mobile terminal includes a housing, a circuit board, a bracket, and a camera device. The circuit board, the bracket, and the camera device are arranged in the housing. The housing is provided with an opening, and is formed with an accommodating cavity in communication with the opening to accommodate the camera device. The camera device includes a camera and a driving assembly, the camera is arranged on the bracket, and the driving assembly is connected to the bracket. The circuit board is provided with a Hall sensor, and the bracket is provided with a first magnet. The position detection method includes: when a trigger operation of a user is received, controlling the driving assembly to drive the bracket to move in a preset direction; obtaining a first induction signal and a second induction signal generated by the Hall sensor, where the first induction signal is generated by sensing a magnetic field of the first magnet by the first working surface of the Hall sensor, and the second induction signal is generated by sensing the magnetic field of the first magnet by the second working surface of the Hall sensor; and determining a position state of the camera based on the obtained first induction signal and second induction signal, where the position state of the camera includes a stretching-out position and a retracting position.

In some embodiments, the determining a position state of the camera based on the obtained first induction signal and second induction signal includes: determining whether the first induction signal and the second induction signal change continuously; when the first induction signal and the second induction signal no longer change, respectively calculating a difference between the first induction signal and a first reference signal, and a difference between the second induction signal and a second reference signal, where the first reference signal and the second reference signal are respectively the induction signals generated by the first working surface and the second working surface of the Hall sensor when the camera is in the stretching-out position; alternatively, the first reference signal and the second reference signal are respectively the induction signals generated by the first working surface and the second working surface of the Hall sensor when the camera is in the retracting position; and determining whether an absolute value of the difference is less than a preset threshold; when the absolute value of the difference is less than the preset threshold, determining that the camera is in the stretching-out position or in the retracting position.

In some embodiments, when the first induction signal and the second induction signal change continuously, it is determined that the camera is in the stretching-out process toward the stretching-out position; or it is determined that the camera is in the retracting process toward the retracting position.

In an embodiment, before the step of "respectively calculating a difference between the first induction signal and a first reference signal, and a difference between the second induction signal and a second reference signal", the position detection method further includes: calculating a difference between the obtained third induction signal and a steady-state signal, where the third induction signal is generated by sensing the magnetic field of the first magnet by the third working surface of the Hall sensor, and the steady-state signal is an induction signal generated by the third working surface of the Hall sensor in an environment in which the mobile terminal is not subject to an external magnetic field; and determining whether an absolute value of the difference is greater than a reference threshold; when the absolute value of the difference is not greater than the reference threshold, respectively calculating the difference between the first induction signal and the first reference signal, and the difference between the second induction signal and the second reference signal.

In an embodiment, when the difference is greater than the reference threshold, the mobile terminal is controlled to send prompt information.

In an embodiment, the trigger operation input by the user includes a trigger operation for starting the camera; the first reference signal includes a first stretching-out reference signal, and the second reference signal includes a second stretching-out reference signal; and the preset threshold includes a first preset threshold. The first stretching-out reference signal and the second stretching-out reference signal are respectively the induction signals generated by the first working surface and the second working surface of the Hall sensor when the camera is in the stretching-out position. The controlling, when a trigger operation of a user is received, the driving assembly to drive the bracket to move in a preset direction includes: when the trigger operation input by the user for starting the camera is received, controlling the driving assembly to drive the bracket to move in the first direction. The respectively calculating a difference between the first induction signal and a first reference signal, and a difference between the second induction signal and a second reference signal includes: respectively calculating a difference between the first induction signal and the first stretching-out reference signal, and a difference between the second induction signal and the second stretching-out reference signal. The determining whether an absolute value of the difference is less than a preset threshold includes: determining whether the absolute value of the difference is less than the first preset threshold. The determining that the camera is in the stretching-out position or in the retracting position when the absolute value of the difference is less than the preset threshold includes: when the absolute value of the difference is less than the first preset threshold, determining that the camera is in the stretching-out position.

In some embodiments, the trigger operation input by the user includes a trigger operation for turning off the camera; the first reference signal further includes a first retracting reference signal, and the second reference signal further includes a second retracting reference signal; and the preset threshold further includes a second preset threshold. The first retracting reference signal and the second retracting reference signal are respectively the induction signals generated by the first working surface and the second working surface of the Hall sensor when the camera is in the retracting position. The controlling, when a trigger operation of a user is received, the driving assembly to drive the bracket to move in a preset direction includes: when a trigger operation input by the user for turning off the camera is received, controlling the driving assembly to drive the bracket to move in the second direction. The respectively calculating a difference between the first induction signal and a first reference signal, and a difference between the second induction signal and a second reference signal further includes: respectively calculating a difference between the first induction signal and the first retracting reference signal, and a difference between the second induction signal and the second retracting reference signal. The determining whether an absolute value of the difference is less than a preset threshold further includes: determining whether the absolute value of the difference is less than the second preset threshold. The determining that the camera is in the stretching-out position or in the retracting position when the absolute value of the difference is less than the preset threshold further includes: when the absolute value of the difference is less than the second preset threshold, determining that the camera is in the retracting position.

In an embodiment, the position detection method further includes: when the absolute value of the difference is not less than the first preset threshold, controlling the bracket to continue to move in the first direction, and determining whether the camera is in the stretching-out position; when the camera is still not in the stretching-out position, controlling the bracket to move in the second direction, so that the camera is in the retracting position.

In an embodiment, the position detection method further includes: when the absolute value of the difference is not less than the second preset threshold, controlling the bracket to continue to move in the second direction, and determining whether the camera is in the retracting position; when the camera is still not in the retracting position, controlling the driving assembly to stop working.

In some embodiments, the position detection method further includes: when the camera is in the stretching-out position, obtaining a first induction signal and a second induction signal generated by the Hall sensor; determining whether the first induction signal and the second induction signal change; when the first induction signal and the second induction signal change, determining whether an amount of the change of the first induction signal and the second induction signal is greater than a third preset threshold; and when the amount of the change of the first induction signal and the second induction signal is greater than the third preset threshold, controlling the driving assembly to drive the bracket to move in the second direction, so that the camera is in the retracting position.

In some embodiments, before the step of "controlling the driving assembly to drive the bracket to move in the second direction, so that the camera is in the retracting position", the position detection method further includes: obtaining a third induction signal generated by the Hall sensor, and calculating a difference between the third induction signal and a steady-state signal; determine whether the absolute value of the difference is greater than the reference threshold; when the absolute value of the difference is not greater than the reference threshold, controlling the driving assembly to drive the bracket to move in the second direction, so that the camera is in the retracting position.

In an embodiment, before the step of controlling the driving assembly to drive the bracket to move in the second direction, so that the camera is in the retracting position, the position detection method further includes: obtaining a third induction signal generated by the Hall sensor, and calculating a difference between the third induction signal and the steady-state signal; obtaining a third induction signal generated by the Hall sensor, and calculating a difference between the obtained third induction signal and the steady-state signal, where the third induction signal is generated by sensing the magnetic field of the first magnet by the third working surface of the Hall sensor, and the steady-state signal is an induction signal generated by the third working surface of the Hall sensor in an environment in which the mobile terminal is not subject to an external magnetic field; determining whether an absolute value of the difference is greater than a reference threshold; when the absolute value of the difference is not greater than the reference threshold, controlling the driving assembly to drive the bracket to move in the second direction, so that the camera is in the retracting position.

In an embodiment, the position detection method further includes: when the absolute value of the difference is greater than the reference threshold, controlling the mobile terminal to generate prompt information.

According to a fourth aspect, an embodiment of this application discloses a computer-readable storage medium, where the computer-readable storage medium stores a program instruction, and the program instruction is invoked to perform the position detection method according to the third aspect.

BRIEF DESCRIPTION OF DRAWINGS

To describe the technical solutions in the embodiments of this application or in the background, the following describes the accompanying drawings required for describing the embodiments of this application or the background.

DESCRIPTION OF EMBODIMENTS

This application provides a mobile terminal and a position detection mechanism applied to the mobile terminal. The position detection mechanism is configured to detect a position of a camera device in the mobile terminal, so as to ensure a position state of the camera, thereby ensuring a shooting effect and protecting the camera device. The following describes the embodiments of this application with reference to the accompanying drawings.

Figure 1:
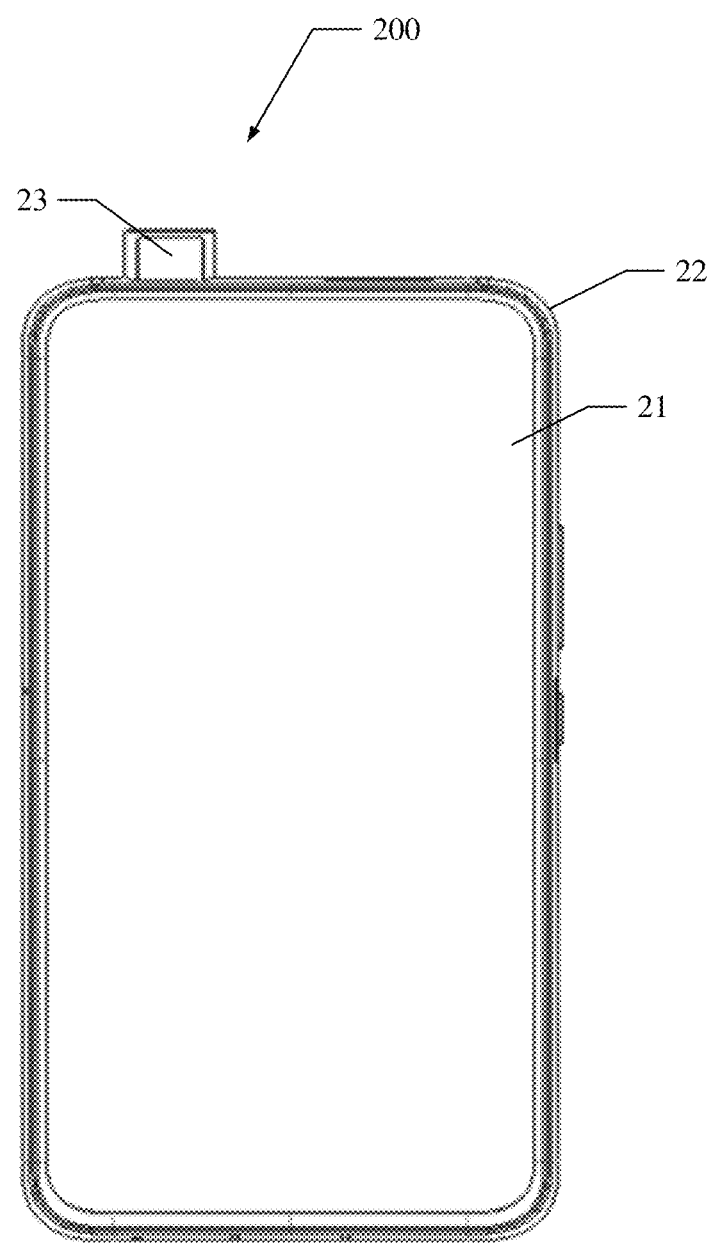
FIG. 1 is a schematic front view of a camera device of a mobile terminal stretching out of a housing according to an embodiment of this application.

FIG. 1 is a schematic front view of a camera device 23 of a mobile terminal 200 stretching out of a housing 22 according to an embodiment of this application. The mobile terminal 200 may be any mobile terminal such as a smartphone, a smart watch, a tablet computer, a personal digital assistant (PDA), a point of sales (POS), a vehicle-mounted computer, a desktop computer, a notebook computer, or a smart TV. This is not limited in this embodiment of this application.

Figure 2:
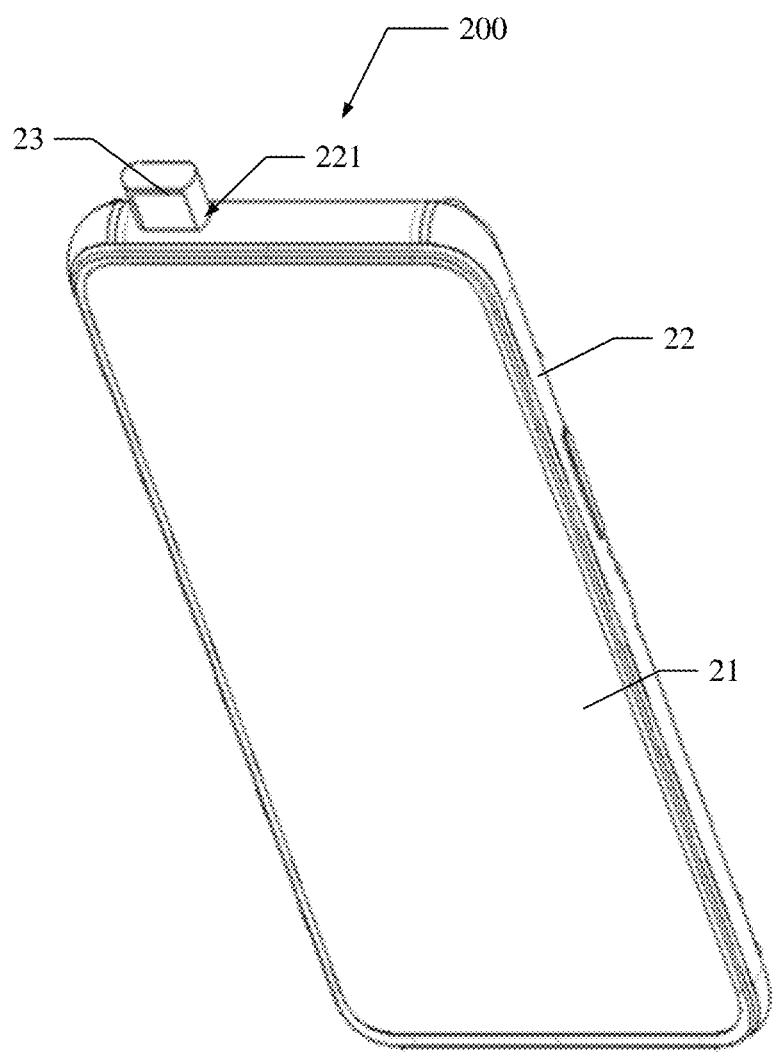
FIG. 2 is a schematic diagram from another perspective of the mobile terminal shown in FIG. 1.

As shown in FIG. 1, the mobile terminal 200 includes a display screen 21, a housing 22, and a camera device 23. The display screen 21 is mounted on the housing 22, and a display surface of the display screen 21 is a front area of the mobile terminal 200. FIG. 2 is a schematic diagram from another perspective of the mobile terminal 200 shown in FIG. 1. The housing 22 is provided with an opening 221. In this embodiment, the opening 221 is located on the top of the mobile terminal 200, and the camera device 23 can stretch out of the housing 22 or retract into the housing 22 from the opening 221. It can be understood that the mounting position of the camera device 23 in the mobile terminal 200 is not limited.

Figure 3:
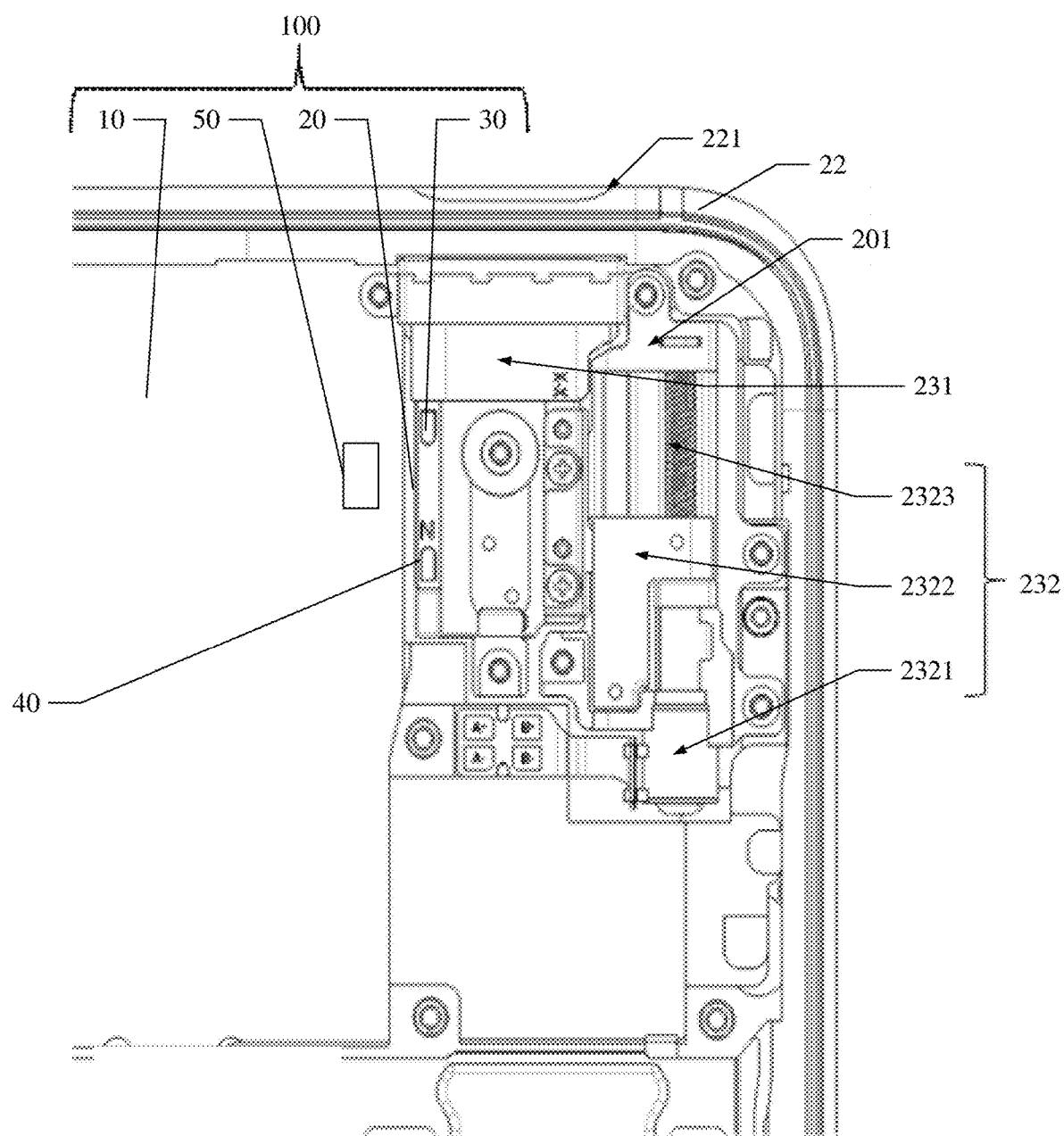
FIG. 3 is a schematic rear view of a part of a structure of a mobile terminal with a rear housing removed according to another embodiment of this application.

FIG. 3 is a schematic rear view of a part of a structure of a mobile terminal 200 with a rear housing removed. As shown in FIG. 3, the housing 22 is internally provided with an accommodating cavity 201. The accommodating cavity 223 is in communication with the opening 221. The camera device 23 can be movably accommodated in the accommodating cavity 201 and can stretch out of or retract into the housing 22 through the opening 221. In an embodiment, the mobile terminal 200 further includes a position detection mechanism 100. The position detection mechanism 100 is arranged in the accommodating cavity 201, and is configured to drive the camera device 23 to stretch out or retract, and to detect a specific position of the camera device 23. The position detection mechanism 100 includes a first body 10, a second body 20, a first magnet 30, and a Hall sensor 50. The second body 20 is spaced apart from the first body 10, and can move relative to the first body 10. The first magnet 30 is arranged on the second body 20, and can move with the second body 20. The Hall sensor 50 is arranged on the first body 10. The camera device 23 is arranged on the position detection mechanism, and stretches out of or retracts into the housing 22 under the driving of the position detection mechanism.

Figure 4:
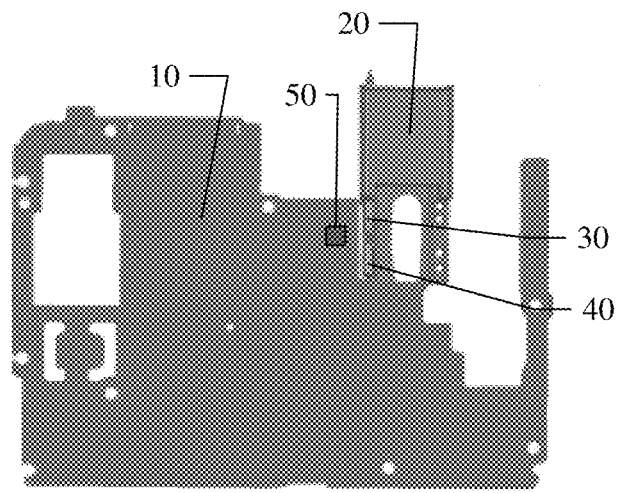
FIG. 4 is a schematic diagram of a position detection mechanism according to an embodiment of this application.

FIG. 4 is a schematic structural diagram of a position detection mechanism 100 according to an embodiment of this application. In this embodiment, the first body 10 is a circuit board, and the circuit board is located in the accommodating cavity 201 and fixedly arranged on the housing 22. The second body 20 is a bracket. The camera device 23 includes a camera 231 and a driving assembly 232. The camera 231 is arranged on the bracket, and the driving assembly 232 is fixedly connected to the bracket to drive the bracket to move, so as to drive the camera 231 to stretch out of or retract into the housing 22 from the opening 221. Specifically, the camera 231 is fixed to an end of the bracket close to the opening 221.

In this embodiment, the Hall sensor 50 is arranged on a side of the circuit board facing the display screen 21. The first magnet 30 is arranged on a side of the bracket facing the display screen 21.

The circuit board, also known as a main board in the mobile terminal 200, is one of the most basic and important components of the mobile terminal 200. Various control chips (such as processors and input/output (I/O) control chips) and various electronic elements (such as various chips, resistors, and capacitors) are mounted on the circuit board, and wiring is laid out on the circuit board. The Hall sensor 50 may be soldered on the circuit board, so that a generated induction signal is transmitted to a target element (such as a processor) through a specific line, so as to implement electrical connection between the Hall sensor 50 and another electronic element. For example, the Hall sensor 50 is electrically connected to the processor, and transmits the generated induction signal to the processor. The processor determines a telescopic position of the camera 231 based on the induction signal.

In this embodiment, the camera device 23 is configured to obtain a scene, a portrait, or the like on a side of the front of the mobile terminal 200, that is, the camera device 23 is used as a front camera device. In another embodiment, the camera device 23 may be used as a rear camera device or the like, and the camera device 23 may alternatively be configured as a rotating camera device, which is not limited herein.

It should be noted that this application does not limit a specific structure of the mobile terminal 200, provided that the mobile terminal 100 is provided with an accommodating cavity 201 for accommodating the camera device 23, and the camera device 23 can stretch out of or retract into the accommodating cavity.

To improve the movement accuracy of the second body 20 and the operation reliability of the mobile terminal, in an embodiment, the driving assembly 232 includes a driving member 2321, an adapter 2322, and a lead screw 2323. The driving member 2321 is located in the accommodating cavity 221, and the lead screw 2323 is rotatably connected to the driving member 2321. One end of the adapter 2322 is fixedly connected to the second body 20, and the other end of the adapter 2322 is rotatably connected to the lead screw 2323. Therefore, when the driving member 2321 drives the lead screw 2323 to rotate, the adapter 2322 can drive the second body 20 to move.

For example, when the driving member 2321 drives the lead screw 2323 to rotate counterclockwise, the second body 20 drives the camera 231 to move in a direction toward the opening 221 (a first direction); when the driving member 2321 drives the lead screw 2323 to rotate clockwise, the second body 20 drives the camera 231 to move in a second direction to retract into the housing 22. It can be understood that a rotation direction in which the driving member 2321 drives the lead screw 2323 is not limited. For example, when the driving member 2321 drives the lead screw 2323 to rotate clockwise, the camera 231 can stretch out of the housing 22 from the opening 221. When the driving member 2321 drives the lead screw 2323 to rotate counterclockwise, the camera 231 can retract into the housing 22 from the opening 221, and is accommodated in the accommodating cavity 201. In this embodiment, the driving member 2321 is a stepper motor. It can be understood that the driving member 2321 is not limited to a stepper motor, and the driving member 2321 may alternatively be a driving apparatus such as an air cylinder or an oil cylinder.

Figure 5:
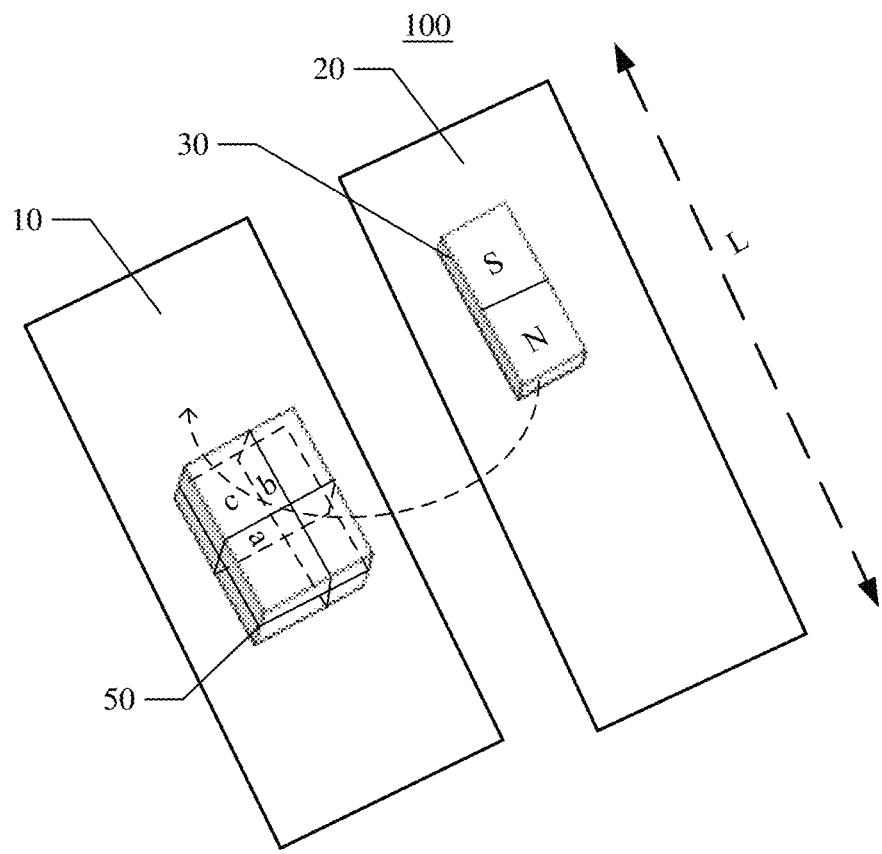
FIG. 5 is a schematic diagram of a position detection mechanism according to another embodiment of this application.

FIG. 5 is a schematic diagram of a position detection mechanism 100 disclosed in another embodiment of this application. The Hall sensor 50 senses a magnetic field of the first magnet 30 and generates an induction signal. The Hall sensor 50 includes a first working surface a and a second working surface b respectively extending in different directions. The Hall sensor 50 senses the magnetic field of the first magnet 30 through the first working surface a and generates a first induction signal, and the Hall sensor 50 further senses the magnetic field of the first magnet 30 through the second working surface b and generates a second induction signal. The first induction signal and the second induction signal are used to determine a position state of the second body 20. The position state of the second body 20 includes a first movement process in which the second body 20 moves in the first direction, a second movement process in which the second body 20 moves in the second direction, a first position state in which the second body 20 moves in the first direction to a first preset position, or a second position state in which the second body 20 moves in the second direction to a second preset position. In an embodiment, the second direction is opposite to the first direction.

That is, the mobile terminal 200 in this embodiment of this application can determine the position state of the camera 231 based on the first induction signal and the second induction signal generated by the Hall sensor 50. For example, when the camera 231 is in the stretching-out position, the user can use the camera 231 to take a photo, and when the camera 231 is in the retracting position, the camera 231 can be protected. The position state of the camera 231 includes a stretching-out process (corresponding to the first movement process), a retracting process (corresponding to the second movement process), a stretching-out position (corresponding to the first position state), or a retracting position (corresponding to the second position state). The "retracting process" here is a process in which the camera 231 retracts from the outside of the accommodating cavity 201 into the accommodating cavity 201. The "stretching-out process" here is a process in which the camera 231 stretches out from the accommodating cavity 201 to the outside of the accommodating cavity 201. The "retracting position" here means that the camera 231 is located in the accommodating cavity 201 of the mobile terminal 200. The "stretching-out position" here means that the camera 231 stretches out of the accommodating cavity 201 of the mobile terminal 231 and is located outside the accommodating cavity 201.

According to the mobile terminal 200 and the position detection mechanism 100 disclosed in this embodiment of this application, because the Hall sensor 50 includes the first working surface a and the second working surface b, the Hall sensor 50 can sense the magnetic field of the first magnet 30 through the first working surface a and generate the first induction signal, and the Hall sensor 50 further senses the magnetic field of the first magnet 30 through the second working surface b and generates the second induction signal, so that when the second body 20 moves relative to the first body 10, the Hall sensor 50 outputs two induction signals (the first induction signal and the second induction signal) to determine the state of the second moving body 20. That is, the position state of the second body 20 can be determined only when both of the two signals meet a preset condition. This can improve the detection accuracy in comparison with the existing Hall sensor having only one working surface.

In an embodiment, to sense the magnetic field generated by the first magnet 30 to a greater extent, and to further improve the detection accuracy, moving directions of the first working surface a and the second body 20 are substantially perpendicular. The second working surface b is substantially perpendicular to the first working surface a, and both the first working surface a and the second working surface b are substantially perpendicular to a surface of the first body 10 on which the Hall sensor 50 is arranged.

In some embodiments, to be able to detect interference of an external magnetic field, the Hall sensor 50 further includes a third working surface c whose extension direction is different from extension directions of both the first working surface a and the second working surface b. The third working surface c may be substantially parallel to the surface of the first body 10 on which the Hall sensor 50 is arranged. The Hall sensor 50 senses the magnetic field of the first magnet 30 and/or the external magnetic field through the third working surface c and generates a third induction signal. The third induction signal is used to determine whether the position detection mechanism 100 is interfered by the external magnetic field. The external magnetic field is a magnetic field generated by an object other than the first magnet 30.

When there is no external magnetic field, the third induction signal generated by the Hall sensor 50 does not change; and when there is an external magnetic field, the third induction signal generated by the Hall sensor 50 changes. That is, when there is no external magnetic field, regardless of how the second body 20 moves relative to the first body 10, magnetic fluxes of the magnetic fields generated by the first magnet 30 and the second magnet 40 described below passing through the third working surface are the same. Alternatively, when there is no external magnetic field, the third induction signal generated by the Hall sensor 50 is 0; and when there is an external magnetic field, the third induction signal generated by the Hall sensor 50 is not 0. That is, when there is no external magnetic field, regardless of how the second body 20 moves relative to the first body 10, magnetic fluxes of the magnetic fields generated by the first magnet 30 and the second magnet 40 described below passing through the third working surface are all 0.

In some embodiments, the third working surface c is substantially perpendicular to the first working surface a and the second working surface b separately, that is, the third working surface c is substantially parallel to the surface of the circuit board facing the display screen, so as to reduce the interference of the existing magnetic field and improve the accuracy of sensing the external magnetic field.

Figure 6:
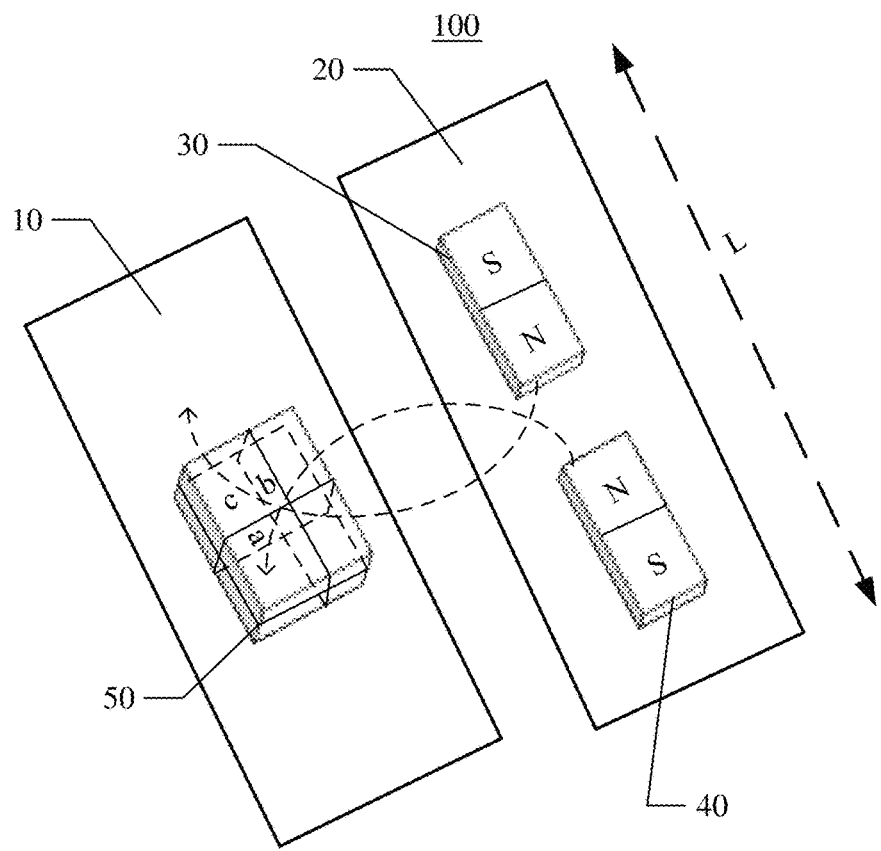
FIG. 6 is a schematic diagram of a position detection mechanism according to still another embodiment of this application.

Refer to FIG. 3, FIG. 4, and FIG. 6 together. FIG. 6 is a schematic diagram of a position detection mechanism 100 disclosed in still another embodiment of this application. In some embodiments, to improve the accuracy of detecting the position state of the second body 20, the position detection mechanism 100 further includes a second magnet 40. The second magnet 40 and the first magnet 30 are spaced apart on the second body 20. The Hall sensor 50 senses the magnetic field of the first magnet 30 and/or the second magnet 40 through the first working surface a and generates the first induction signal, and the Hall sensor 50 further senses the magnetic field of the first magnet 30 and/or the second magnet 40 through the second working surface b and generates the second induction signal. In this embodiment, because the first induction signal and the second induction signal are generated by sensing at least one of the two magnets, when the second body 20 is moving, the first induction signal and the second induction signal have a relatively high change rate. Further, a moving position of the second body 20 can be determined based on different first induction signals and second induction signals, thereby improving the accuracy of detecting the position state of the second body.

In some embodiments, when the second body 20 moves relative to the first body 10, the first magnet 30 and the second magnet 40 move relative to the Hall sensor 50, and the Hall sensor 50 is always located in a range of the magnetic field generated by at least one of the first magnet 30 and the second magnet 40, so that regardless of a position to which the second body 20 moves relative to the first body 10, the Hall sensor 50 can generate the first induction signal and the second induction signal, thereby ensuring the stability of detection.

For example, in an embodiment, regardless of how the second body 20 moves, as long as it is ensured that during the movement of the second body 20, a distance between the center point of the Hall sensor 50 and the surface of the magnet closest to the Hall sensor 50 is less than 5 mm, it can be ensured that the Hall sensor 50 is always located in the ranges of the magnetic fields generated by the first magnet 30 and the second magnet 40. Certainly, a volume of the Hall sensor 50 and a volume of the magnet are not fixed, intensity of the generated magnetic field is uncertain, and a capability to sense the magnetic field is also uncertain. Therefore, a relative position between the Hall sensor 50 and the first magnet 30 and the second magnet 40 is not limited, as long as it can be ensured that when the second body 20 moves relative to the first body 10, the Hall sensor 50 is always located in the range of the magnetic field generated by at least one of the first magnet 30 and the second magnet 40.

It can be understood that because the relative distance between the first body 10 and the second body 20 is not fixed and may be set according to specific design needs, the position of arranging the Hall sensor 50 on the circuit board, and the positions of arranging the first magnet 30 and the second magnet 40 on the second body 20 are also not fixed, as long as it can be ensured that regardless of how the second body 20 moves relative to the first body 10, the Hall sensor 50 is always located in the range of the magnetic field generated by at least one of the first magnet 30 and the second magnet 40.

In addition, in some embodiments, the magnetic field generated by the first magnet 30 and the magnetic field generated by the second magnet 40 are superimposed, so that when the second body 20 moves relative to the circuit board, a magnetic flux sensed by the first working surface a and the second working surface b greatly changes. This can improve sensitivity of the Hall sensor 50 to sense the magnetic field, thereby improving the accuracy of detecting the state of the second body 20.

For example, in an embodiment, when a distance between two adjacent end surfaces of the first magnet 30 and the second magnet 40 is less than 6 mm, it can be ensured that the magnetic fields generated by the first magnet 30 and the second magnet 40 are superimposed. Certainly, because magnets having different volumes generate different magnetic fields, the distance between the first magnet 30 and the second magnet 40 is not limited, as long as it can be ensured that the magnetic fields generated by the first magnet 30 and the second magnet 40 are superimposed.

In a specific embodiment, the first magnet 30 and the second magnet 40 are both bar magnets to facilitate control in the production process and foolproofness during production line processing. Certainly, the shapes of the first magnet 30 and the second magnet 40 are not specifically limited. For example, in another embodiment, the first magnet 30 and the second magnet 40 may alternatively be cylindrical magnets with a semicircular cross section. A planar surface of the cylindrical magnet is used for fixed connection to the second body 20 to ensure the stability of the arrangement of the first magnet 30 and the second magnet 40.

In an embodiment, the connection line between the center point of the first magnet 30 and the center point of the second magnet 40 is substantially parallel to the moving direction of the second body 20. This can ensure the positional relationship between the Hall sensor 50 and the first magnet 30 and the second magnet 40 when the second body 20 moves (an arrow L in FIG. 5), so as to ensure that the Hall sensor 50 can sense the magnetic fields generated by the first magnet 20 and the second magnet 30. The center point refers to the center of gravity of the element. When an element is a regular object, the center point of the element is the geometric center of the regular object.

In some embodiments, the north-south axis of the first magnet 30 and the north-south axis of the second magnet 40 are substantially parallel to the moving direction of the second body 20 separately, so that during the movement of the second body 20, the Hall sensor 50 can sense a superimposed magnetic field generated by the first magnet 30 and the second magnet 40.

To ensure the detection sensitivity of the Hall sensor 50, the superimposed magnetic field generated by the first magnet 30 and the second magnet 40 needs to ensure that during the movement of the second body 20 relative to the first body 10, a change rate of the first induction signal and the second induction signal generated by the Hall sensor 50 meets a specific requirement. Therefore, in an embodiment, the adjacent ends of the first magnet 30 and the second magnet 40 are magnetic poles with the same name. In an embodiment, the magnetic pole with the same name is an N pole.

The north-south axis is a vector of the magnet from the N pole to the S pole, that is, the direction of the magnetic pole. The most magnetic part of the magnet is referred to as the magnetic pole. A magnet that rotates freely in a horizontal plane always has one magnetic pole pointing to the south and the other magnetic pole pointing to the north when the magnet is stationary. The magnetic pole pointing to the south is referred to as the south pole (S pole), and the magnetic pole pointing to the north is referred to as the north pole (N pole).

It should be noted that in the embodiments of this application, the term "substantially parallel" may be interpreted as being parallel, being approximately parallel, or having a specific preset angle; the term "approximately perpendicular" may be interpreted as being vertical, being approximately vertical, or having a specific preset angle.

Figure 7:
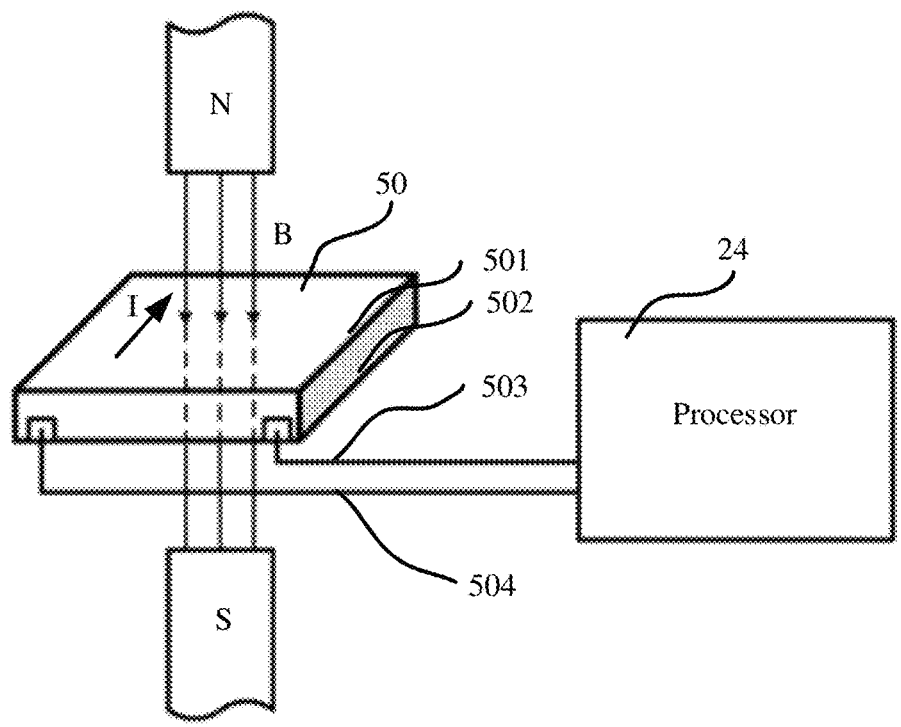
FIG. 7 is a schematic diagram of a working principle of a Hall sensor shown in FIG. 5.

FIG. 7 is a schematic diagram of a working principle of a Hall sensor 50. As shown in FIG. 7, the Hall sensor 50 includes a Hall element. For example, the Hall element is a semiconductor sheet. A working surface of the Hall sensor 50 refers to a plane on which the Hall sensor senses a magnetic field, that is, a plane on which the semiconductor sheet is located. When the Hall sensor 50 is working, a current flows through the semiconductor sheet, and a magnetic field is applied in a vertical direction of the sheet. In this case, the sheet generates a potential difference in a direction perpendicular to the current and the magnetic field. For example, when the working surface of the Hall sensor 50 is located between the first surface 501 and the second surface 502, and is separately parallel to the first surface 501 and the second surface 502, and when the magnetic field passes through the Hall sensor 50 from a first surface (an upper surface) 501 of the Hall sensor 50, a first output terminal 503 of the Hall sensor 50 outputs a low-level signal, and a second output terminal 504 outputs a high-level signal. On the contrary, when the magnetic field passes through the Hall sensor 50 from a second surface (a lower surface) 502 of the Hall sensor 50, the first output terminal 503 of the Hall sensor 50 outputs a high-level signal, and the second output terminal 504 outputs a low-level signal.

It should be noted that FIG. 7 uses the Hall sensor 50 with two voltage signal output terminals corresponding to each working surface as an example to illustrate the working principle of the Hall sensor. In another embodiment, each working surface of the Hall sensor 50 may alternatively correspond to one output terminal, three output terminals, and the like. An output signal of each output terminal may be a voltage signal or a current signal, which is not limited herein. When the magnetic field passes through the working surface of the Hall sensor 50, the output terminal of the Hall sensor 50 outputs an electrical signal in the form of a voltage or current. When directions of the magnetic field passing through the working surface of the Hall sensor 50 are different, the output electrical signals are different. Different electrical signals are used to indicate a processor 24 of a terminal to perform different operations.

In addition, the Hall sensor 50 used in this embodiment of this application may be a linear Hall sensor, which includes a Hall element, a linear amplifier, and an emitter follower. The Hall sensor 50 outputs an analog signal. Certainly, the Hall sensor 50 may alternatively be a switch-type Hall sensor, which includes a voltage regulator, a Hall element, a differential amplifier, a Schmitt trigger, and an output stage. The Hall sensor 50 outputs a digital signal.

It should be noted that regardless of which type of Hall sensor, the Hall sensor can be set to output different induction signals based on different detected magnetic field intensity. Therefore, when the second body 20 moves to a different position relative to the first body 10, the magnetic field intensity sensed by the Hall sensor 50 is different. In this way, the position state of the camera 231 can be determined based on the first induction signal and the second induction signal generated by the Hall sensor 50. When the camera 231 is in a different position, the magnetic field sensed by the Hall sensor 50 is different, that is, as the second body 20 moves, magnetic fluxes passing through a first working surface a and a second working surface b of the Hall sensor 50 are different, and thus generated induction signals are different.

Figure 8:
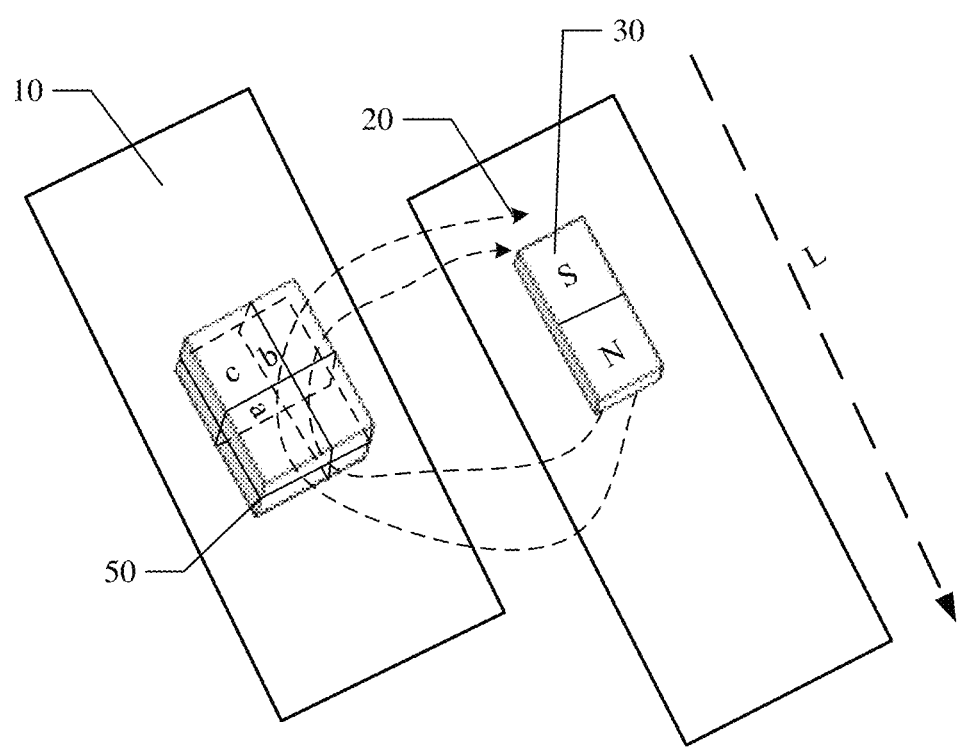
FIG. 8 is a schematic diagram when a second body in FIG. 5 is in a second position state.

FIG. 8 is a schematic diagram when a second body 20 of a position detection mechanism 100 in FIG. 5 is in a second position state. As shown in FIG. 8, when the second body 20 is in the second position state (corresponding to the retracting position of the camera 231), most of magnetic lines of force emitted by the N pole of the first magnet 30 can pass through the first working surface a and the second working surface b, and return to the S pole of the first magnet 30. Assuming that in this case, a magnetic flux passing through the first working surface a is Φ1, and a magnetic flux passing through the second working surface b is Φ2, the first working surface a generates a first induction signal v1, and the second working surface b generates a second induction signal v2. The first induction signal v1 and the second induction signal v2 may be the same or different. As the second body 20 moves, a distance between the N pole of the first magnet 30 and the Hall sensor 50 is getting closer and then gradually farther away. In this process, a quantity of magnetic lines of force passing through the first working surface a and the second working surface b changes, and therefore, the first induction signal v1 and the second induction signal v2 change accordingly. For example, the induction signal is a voltage signal in this embodiment. When a magnetic flux passing through the working surface is larger, a voltage signal output by the Hall sensor is stronger.

Figure 9:
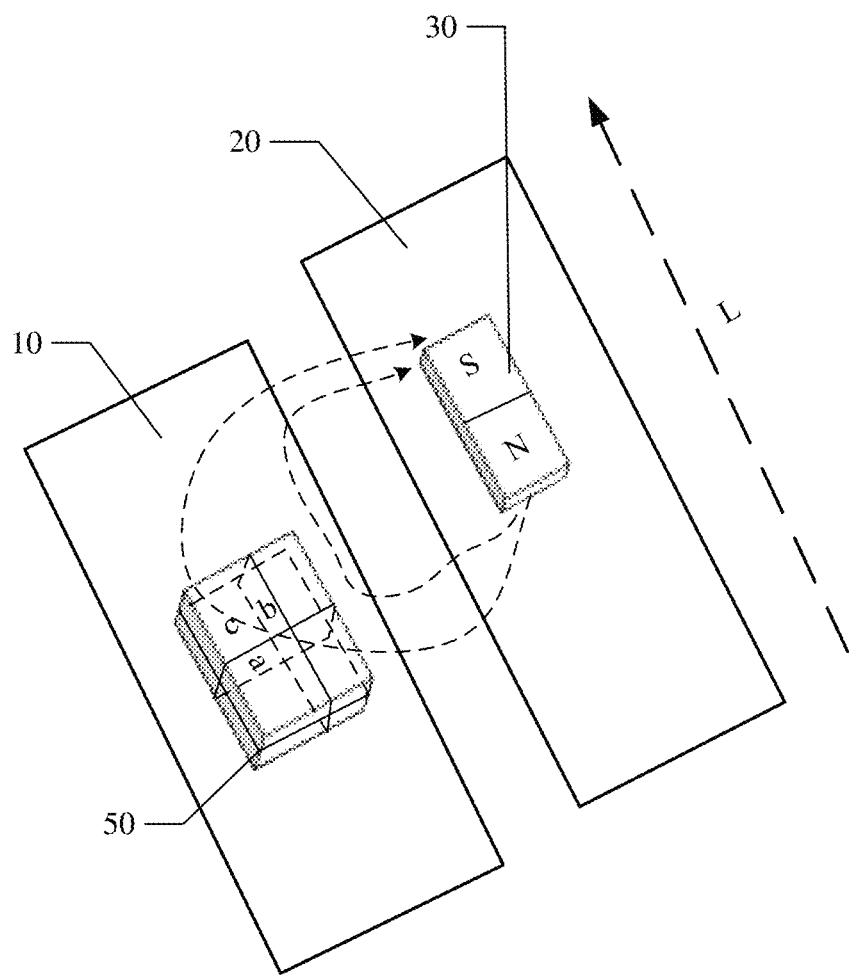
FIG. 9 is a schematic diagram when a second body in FIG. 5 is in a first position state.

FIG. 9 is a schematic diagram when a second body 20 of a position detection mechanism 100 in FIG. 5 is in a first position state. As shown in FIG. 9, when the second body 20 moves to the first position state (corresponding to the camera 231 in the stretching-out position), assuming that a magnetic flux passing through the first working surface a is Φ3, and a magnetic flux passing through the second working surface b is Φ4, the first working surface a generates a first induction signal v3, and the second working surface b generates a second induction signal v4. Because at this position, only some of the magnetic lines of force emitted by the N pole of the first magnet 30 can pass through the first working surface a and the second working surface b and return to the S pole of the first magnet 30, the first induction signal v3 is weaker than the first induction signal v1, and the second induction signal v4 is weaker than the second induction signal v2. That is, when the second body 20 moves to a different position relative to the first body 10, the first induction signals generated by the first working surface a of the Hall sensor 50 are different, and the second induction signals generated by the second working surface b of the Hall sensor 50 are also different. Therefore, the moving position of the second body 20 relative to the first body 10 can be determined based on the first induction signal and the second induction signal.

In some embodiments, to ensure that during the movement of the second body 20, the Hall sensor 50 can generate both the corresponding first induction signal and the corresponding second induction signal, regardless of whether the second body 20 is in the first position state or in the second position state, a connection line between the center point of the Hall sensor 50 and the center of an end surface of the first magnet 30 with polarity and close to the center of the Hall sensor 50 is substantially perpendicular to the moving direction of the second body 20.

Figure 10:
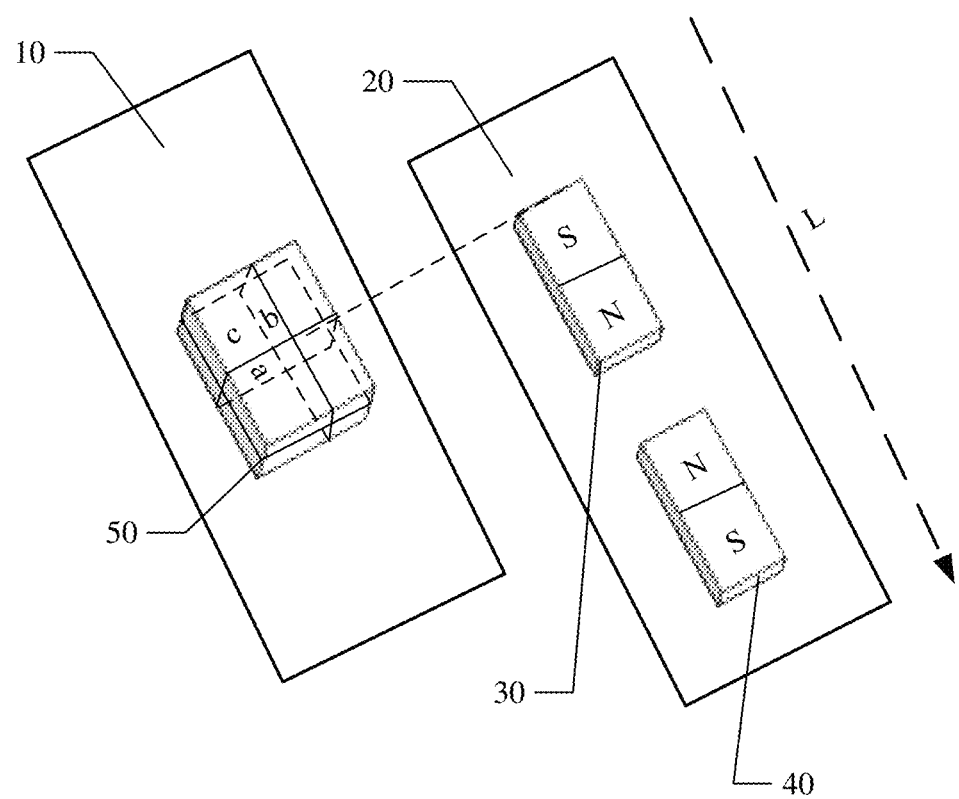
FIG. 10 is a schematic diagram when a second body in FIG. 6 is in a second position state.
Figure 11:
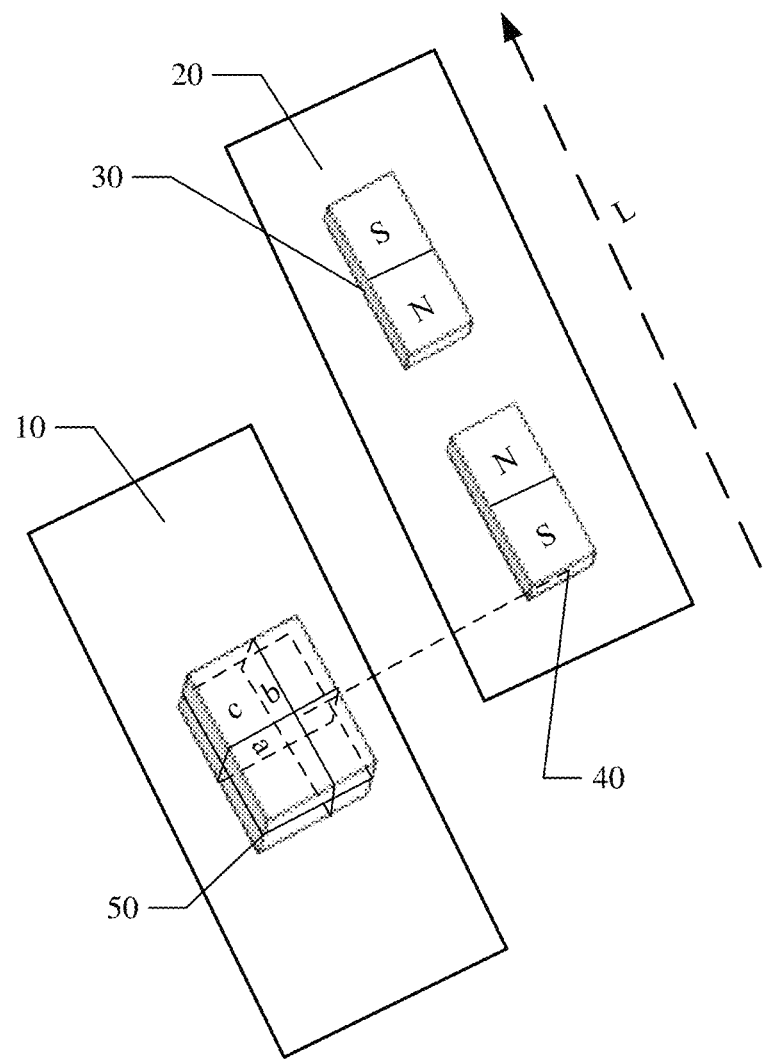
FIG. 11 is a schematic diagram when a second body in FIG. 6 is in a first position state.

Refer to FIG. 10 and FIG. 11 together. FIG. 10 is a schematic diagram when a second body 20 of a position detection mechanism 100 in FIG. 6 is in a second position state. FIG. 11 is a schematic diagram when a second body 20 of a position detection mechanism 100 in FIG. 6 is in a first position state. Likewise, when the second body 20 is provided with the first magnet 30 and the second magnet 40, to ensure that during the movement of the second body 20, the Hall sensor 50 generates the corresponding first induction signal and the corresponding second induction signal, in some embodiments, when the second body 20 is in the second position state, an end surface of the first magnet 30 away from the second magnet 40 is close to the Hall sensor 50, and a connection line between the center point of the Hall sensor 50 and the center of an end surface of the first magnet 30 with polarity and close to the center of the Hall sensor 50 is substantially perpendicular to the moving direction of the second body 20; when the second body 20 is in the first position state, an end surface of the second magnet 40 away from the first magnet 30 is close to the Hall sensor 50, and a connection line between the center point of the Hall sensor 50 and the center of an end surface of the second magnet 40 with polarity and close to the center of the Hall sensor 50 is substantially perpendicular to the moving direction of the second body 20.

Figure 12:
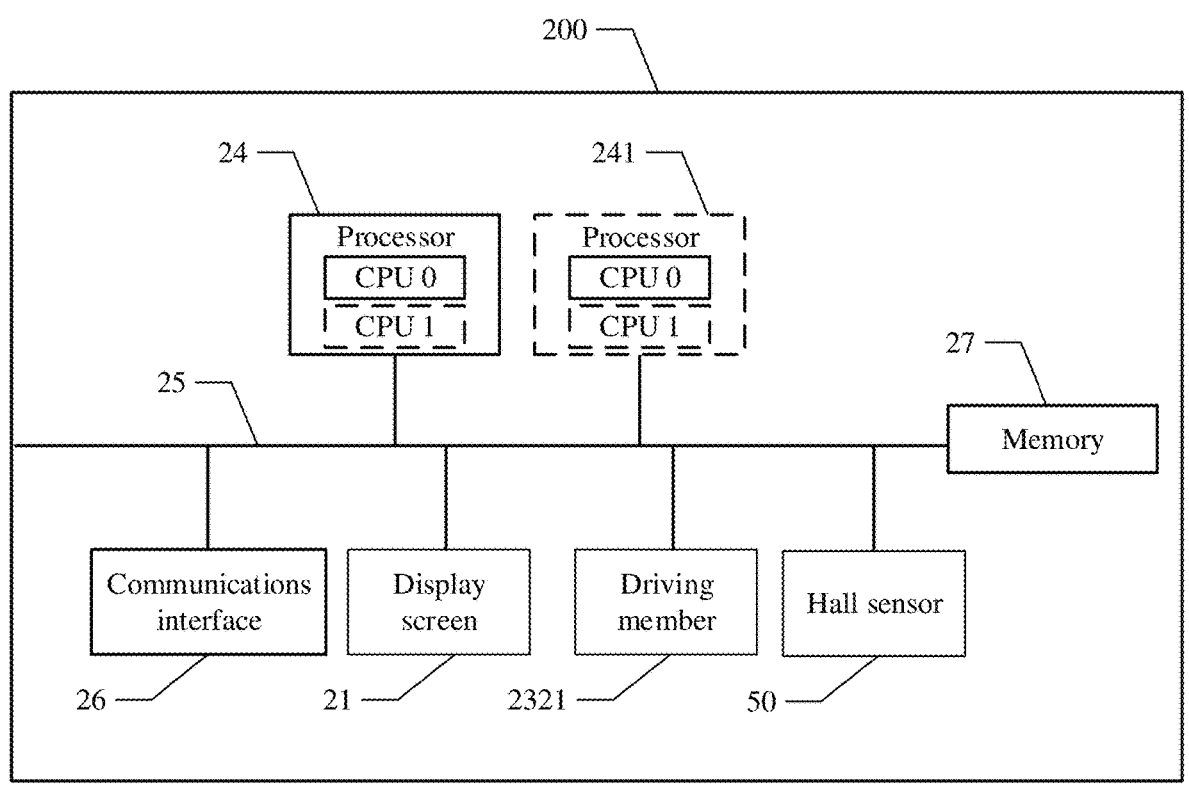
FIG. 12 is a structural block diagram of a mobile terminal according to an embodiment of this application.

FIG. 12 is a structural block diagram of a mobile terminal 200 according to an embodiment of this application. The mobile terminal 200 further includes at least one processor 24, a communications bus 25, at least one communications interface 26, and a memory 27. It can be understood that FIG. 12 is only an example of the mobile terminal 200 and does not constitute a limitation on the mobile terminal 200. The mobile terminal 200 may include more or fewer components than those shown in FIG. 12, or combine some components, or different components. For example, the mobile terminal 200 may further include an input/output device, a network access device, and the like.

The processor 24 is communicatively connected to the at least one communications interface 25, the memory 27, the display screen 21, the driving member 2321, and the Hall sensor 50 through the communications bus 25. The processor 24 may be a central processing unit (CPU), or the processor may be another general-purpose processor, a digital signal processor (DSP), an application-specific integrated circuit (ASIC), a field-programmable gate array (FPGA) or another programmable logic device, a discrete gate or transistor logic device, a discrete hardware assembly, or the like. The general-purpose processor may be a microprocessor or the processor may be any conventional processor, and so on. The processor is a control center of the mobile terminal 200, and is connected to various parts of the entire mobile terminal 200 by using various interfaces and lines.

The communications bus 25 may include a path for transmitting information between the foregoing components.

The communications interface 26 is configured to communicate, by using any apparatus like a transceiver, with another device or a communications network, such as the Ethernet, a radio access network (RAN), or a wireless local area network (WLAN).

The memory 27 can be configured to store a computer program and/or a module. The processor 24 implements various functions of the mobile terminal 200 by running or executing the computer program and/or the module stored in the memory 27 and by invoking data stored in the memory 27. The memory 27 may primarily include a program storage area and a data storage area. The program storage area may store an operating system, an application program needed by a plurality of functions (such as a sound play function and an image play function), and the like. The data storage area may store data (such as audio data and a phonebook) created based on use of the mobile terminal 200, and the like. In addition, the memory 27 may include a high-speed random access memory, and may further include a non-volatile memory, such as a hard disk, a memory, a plug-in hard disk, a smart media card (SMC), a secure digital (SD) card, a flash memory card (Flash Card), a plurality of magnetic disk storage devices, a flash memory device, or another volatile solid-state storage device. The memory 27 may exist independently, and be connected to the processor 24 by using the communications bus 25. Alternatively, the memory 27 may be integrated into the processor 24.

During specific implementation, in an embodiment, the processor 24 may include one or more CPUs, such as a CPU 0 and a CPU 1 in FIG. 7.

During specific implementation, in an embodiment, the mobile terminal 200 may include a plurality of processors, for example, the processor 24 and a processor 241 in FIG. 8. Each of the processors may be a single-core (e.g., single-CPU) processor or may be a multi-core (e.g., multi-CPU) processor. The processor herein may be one or more devices, circuits, and/or processing cores configured to process data (such as a computer program instruction).

In an embodiment of this application, when the camera 231 needs to stretch out of the housing 22, the processor 24 may send a control signal to the driving member 2321 to control the driving member 2321 to work, so as to drive the second body 20 to move, and further drive the camera 231 to move in the direction of stretching out of the opening 221 of the mobile terminal 200, or to move in the direction of retracting into the accommodating cavity 201 of the mobile terminal 200. In this case, the Hall sensor 50 can generate the first induction signal and the second induction signal by sensing the magnetic fields of the first magnet 30 and the second magnet 40, and provide feedback to the processor 24. The processor 24 may compare the signal generated by the Hall sensor 50 with a reference signal, and determine the state of the camera 231 based on a comparison result.

In an embodiment, when receiving a trigger operation input by a user, the processor 24 controls the driving assembly 232 to work, so as to drive the second body 20 to move, and further drive the camera 231 to stretch out of or retract into the housing 22 from the opening 221. The processor 24 further obtains the first induction signal and the second induction signal sent by the Hall sensor 50, and determines the position state of the camera 231 based on the obtained first induction signal and second induction signal.

That the processor 24 obtains the first induction signal and the second induction signal sent by the Hall sensor 50, and determines the position state of the camera 231 based on the obtained first induction signal and second induction signal includes: the processor 24 obtains the first induction signal and the second induction signal sent by the Hall sensor 50, and determines whether the first induction signal and the second induction signal change continuously. When the first induction signal and the second induction signal no longer change, the processor 24 respectively calculates a difference between the first induction signal and a first reference signal, and a difference between the second induction signal and a second reference signal. The processor 24 further determines whether an absolute value of the difference is less than a preset threshold. When the absolute value of the difference is less than the preset threshold, the processor 24 determines that the camera 231 is in the stretching-out position or in the retracting position. When the first induction signal and the second induction signal change continuously, the processor 24 determines that the camera 231 is in the stretching-out process or the retracting process.

In some embodiments, the trigger operation input by the user includes a trigger operation for starting the camera; the first reference signal includes a first stretching-out reference signal, and the second reference signal includes a second stretching-out reference signal; the preset threshold includes a first preset threshold. When receiving the trigger operation input by the user for starting the camera 231, the processor 24 controls the driving assembly 232 to work, so as to drive the second body 20 to move in a first direction, so that the camera 231 is in the stretching-out process. The processor 24 further obtains the first induction signal and the second induction signal sent by the Hall sensor 50 when the camera 231 is in the stretching-out process. When the first induction signal and the second induction signal no longer change, the processor 24 respectively calculates the difference between the first induction signal and the first stretching-out reference signal, and the difference between the second induction signal and the second stretching-out reference signal. The processor 24 further determines whether the absolute value of the difference is less than the first preset threshold, and when the absolute value of the difference is less than the first preset threshold, determines that the camera 231 is in the stretching-out position.

When the second body 20 moves in the first direction, the positions of the first magnet 30 and the second magnet 40 relative to the Hall sensor 50 change, and therefore, the first induction signal and the second induction signal output by the Hall sensor 50 are constantly changing. When the second body 20 stops moving, the positions of the first magnet 30 and the second magnet 40 relative to the Hall sensor 50 are fixed. In this case, the first induction signal and the second induction signal output by the Hall sensor 50 tend to be stable, that is, do not change. Therefore, when the obtained first induction signal and second induction signal change continuously, it indicates that the second body 20 is in a moving state, that is, the camera 231 is in the stretching-out or retracting process. When the obtained first induction signal and second induction signal no longer change, it indicates that the second body 20 is in a state of stopping moving. In this case, the processor 24 respectively calculates the difference between the first induction signal and the first stretching-out reference signal, and the difference between the second induction signal and the second stretching-out reference signal, and when the absolute value of the difference is less than the first preset threshold, determines that the second body 20 has moved to the first preset position, that is, the camera 231 is in the stretching-out position. In this way, it can be detected whether the camera 231 normally stretches out and is in the stretching-out position. In this embodiment, because the Hall sensor 50 can generate two induction signals, using the two induction signals as a basis for the determining can improve the accuracy of detection.

In some embodiments, the first induction signal and the second induction signal generated by the Hall sensor 50 when the camera 231 is in the stretching-out position may be detected in advance, and an average value of a plurality of first induction signals obtained through a plurality of detections is calculated, and the average value is used as the first stretching-out reference signal. Similarly, an average value of a plurality of second induction signals obtained through a plurality of detections is calculated, and the average value is used as the second stretching-out reference signal.

When the absolute value of the difference is not less than the first preset threshold, it indicates that the second body 20 has not moved to the first preset position, that is, the camera 231 has not completely stretched out of the housing 22. In this case, a possible reason is that the second body 20 is hindered during the movement, for example, resistance to the movement of the second body 20 is greater than a driving force of the driving member 2321, and consequently the second body 20 stops moving in the movement process. Another possible reason is that a specific structure of the mobile terminal 200 is faulty. In this case, if the driving member 2321 continues to work, the driving assembly 232 and the second body 20 may be damaged. Therefore, to avoid this situation, in some embodiments, when the absolute value of the difference is not less than the first preset threshold, the processor 24 controls the driving assembly 232 to continue to work, so as to drive the second body 20 continue to move in the first direction, and determines whether the camera 231 is in the stretching-out position. When the camera 231 is still not in the stretching-out position, the processor 24 controls the driving assembly 232 to drive the second body 20 to move in the second direction, so as to drive the camera 231 to retract into the housing 22, thereby protecting the camera 231 and the driving assembly 232.

In some embodiments, when determining that the camera 231 is in the stretching-out position, the processor 24 further records a quantity of times the camera 231 is in the stretching-out position, so as to indicate that the camera 231 has successfully stretched out of the housing 22. For example, the processor 24 can control a number of a counter from 0 to 1 to indicate that the camera 231 has successfully stretched out of the housing 22, and when the camera 231 retracts into the housing 22, control the counter to be cleared.

In another embodiment, the trigger operation input by the user includes a trigger operation for turning off the camera; the first reference signal includes a first retracting reference signal, and the second reference signal includes a second retracting reference signal; the preset threshold includes a second preset threshold. When receiving the trigger operation input by the user for turning off the camera 231, the processor 24 controls the driving assembly 232 to work, so as to drive the second body 20 to move in a second direction, so that the camera 231 is in the retracting process. The processor 24 further obtains the first induction signal and the second induction signal sent by the Hall sensor 50 when the camera 231 is in the retracting process, and determines whether the first induction signal and the second induction signal change continuously. When the first induction signal and the second induction signal no longer change, the processor 24 respectively calculates the difference between the first induction signal and the first retracting reference signal, and the difference between the second induction signal and the second retracting reference signal. The processor 24 further determines whether the absolute value of the difference is less than the second preset threshold, and when the absolute value of the difference is less than the second preset threshold, determines that the camera 231 is in the retracting position.

In some embodiments, the first induction signal and the second induction signal generated by the Hall sensor 50 when the camera 231 is in the retracting position may be detected in advance, and an average value of a plurality of first induction signals obtained through a plurality of detections when the camera 231 is in the retracting position is calculated, and the average value is used as the first retracting reference signal. Similarly, an average value of a plurality of second induction signals obtained through a plurality of detections when the camera 231 is in the retracting position is calculated, and the average value is used as the second retracting reference signal.

The second preset threshold may be the same as or may be different from the first preset threshold, and may be specifically set according to design requirements. In addition, the first stretching-out reference signal, the first retraction reference signal, the second stretching-out reference signal, and the second retraction reference signal may be different, and may be set before the mobile terminal is delivered and stored in the memory 27.

When the absolute value of the difference is not less than the preset threshold, it indicates that the second body 20 has not moved to the second preset position, that is, the camera 231 has not completely retracted into the housing 22. In this case, a possible reason is that the second body 20 is hindered during the movement, for example, resistance to the movement of the second body 20 is greater than a driving force of the driving member 2321, and consequently the second body 20 stops moving in the movement process. Another possible reason is that a specific structure of the mobile terminal 200 is faulty. In this case, if the driving member 2321 continues to work, the driving assembly 232 and the second body 20 may be damaged. Therefore, to avoid this situation, in some embodiments, when the absolute value of the difference is not less than the second preset threshold, the processor 24 controls the driving assembly 232 to continue to work, so as to drive the second body 20 to continue to move in the second direction, and further determines whether the camera 231 is in the retracting position. When the camera 231 is still not in the retracting position, the processor 24 controls the driving assembly 232 to stop working, so as to protect the driving assembly 232 and the second body 20.

In some embodiments, when determining that the camera 231 is in the retracting position, the processor 24 further records a quantity of times the camera 231 is in the retracting position, so as to indicate that the camera 231 has successfully retracted into the housing 22. For example, the processor 24 can control a number of a counter from 0 to 1 to indicate that the camera 231 has successfully retracted into the housing 22.

In the process of detecting the position state of the camera 231, interference of the external magnetic field may also exist, and when the interference of the external magnetic field exists, there is an error in the position detection of the camera 231, that is, incorrect determining easily occurs. Therefore, to ensure the accuracy of detecting the position of the camera 231, in some embodiments, regardless of whether in the process of detecting the stretching-out position of the camera 231 or in the process of detecting the retracting position of the camera 231, when the obtained first induction signal and second induction signal no longer change, the processor 24 further obtains a third induction signal generated by the Hall sensor 50, and calculates a difference between the third induction signal and a steady-state signal. The processor further determines whether an absolute value of the difference is greater than a reference threshold. When the absolute value of the difference is greater than the reference threshold, it indicates that interference of an external magnetic field exists. In this case, the processor 24 controls the mobile terminal 200 to send prompt information, so as to prompt the user to stay away from the magnetic field. When the absolute value of the difference is not greater than the reference threshold, it indicates that no interference of an external magnetic field exists, or interference of an external magnetic field is relatively weak and does not affect the position detection for the camera 231. In this case, the position of the camera 231 can be detected. The steady-state signal is an induction signal generated by the third working surface c of the Hall sensor 50 when the mobile terminal 200 is not interfered by an external magnetic field. For example, when there is no external magnetic field, the third working surface c may not generate a signal, and the steady-state signal may be set to 0 in this case; when there is no external magnetic field, the third working surface c can further generate a constant induction signal. This constant signal may be used as the steady-state signal. When there is an external magnetic field, the induction signal generated by the third working surface c changes in comparison with the steady-state signal, and when an amount of the change exceeds the reference threshold, it indicates that the external magnetic field is relatively strong. In addition, the reference threshold is not limited, and may be determined according to specific design requirements.

In some embodiments, the mobile terminal 200 may be placed in an environment without interference of an external magnetic field in advance, and an average value of a plurality of third induction signals obtained through a plurality of detections is calculated, and the average value is used as the steady-state signal. The steady-state signal may alternatively be set before the mobile terminal 200 is delivered, and stored in the memory 27.

The mobile terminal 200 may include a prompting apparatus, for example, a light-emitting diode or a buzzer. When it is determined that interference of an external magnetic field exists, the light-emitting diode can be controlled to emit light, or the buzzer can be controlled to emit sound. Certainly, the prompting apparatus may alternatively be a display screen 10. When it is determined that interference of an external magnetic field exists, the display screen 10 is controlled to display prompt information.

When it is determined that the camera 231 is in the stretching-out position, if the processor 24 does not receive a trigger operation of the user for turning off the camera, the camera 231 should be always in the stretching-out position, that is, the second body 20 is in the first preset position and does not move. However, when the camera 231 receives external pressure, for example, when the user wants to manually press the camera 231 to make the camera retract into the housing 22, if the driving member 2321 is still not working in this case, a service life of the driving member 2321 is affected, or even the driving member 2321 is damaged. Therefore, to avoid this situation, in some embodiments, when determining that the camera 231 is in the stretching-out position, the processor 24 further obtains the first induction signal and the second induction signal sent by the Hall sensor 50 when the camera 231 is in the stretching-out position, and determines whether the first induction signal and the second induction signal change. When the first induction signal and the second induction signal change, the processor 24 determines whether an amount of the change of the first induction signal and the second induction signal is greater than a third preset threshold. When the amount of the change of the first induction signal and the second induction signal is greater than the third preset threshold, the processor 24 controls the driving assembly 232 to work, so as to drive the second body 20 to move in the second direction, so that the camera 231 retracts into the housing 22. Whether the first induction signal and the second induction signal change refers to whether the first induction signal at the current moment changes in comparison with the first induction signal at the previous moment, and whether the second induction signal at the current moment changes in comparison with the second induction signal at the previous moment.

When the amount of the change of the first induction signal and the second induction signal is greater than the third preset threshold, because the user's operation for turning off the camera 231 is not received, it indicates that the camera 231 is in a state of being pressed by an external force. In this case, the processor 24 controls the driving member 2321 to work, so as to drive the second body 20 to move in the second direction, and further drive the camera 231 to retract into the housing 22. In this way, after pressure is applied to the camera 23, the mobile terminal 200 automatically controls the camera 231 to retract into the housing 22. In addition to the trigger command sent by a button or a touch operation, the mobile terminal 200 can further respond to triggering by external pressure, to control the camera 231 to retract into the housing 22. This enriches the ways to turn off the camera 231, improves user experience, and can protect the driving assembly 232.

However, the change of the first induction signal and the second induction signal may not be caused by the movement of the second body 20 resulting from the external pressure on the camera 231. It is possible that interference of the external magnetic field exists. Therefore, when the camera 231 is in the stretching-out position, and the first induction signal and the second induction signal output by the Hall sensor 50 change, it is further necessary to determine whether interference of the external magnetic field exists, so as to avoid incorrect determining and further avoid affecting user experience. For example, when the user is using the camera 231 to take a photo, in this case, if it is detected that the first induction signal and the second induction signal output by the Hall sensor 50 change, and the camera 231 is controlled to retract, the user's photo taking is interrupted, causing poor user experience.

Therefore, in some embodiments, before the processor 24 controls the driving assembly 232 to work, so as to drive the second body 20 to move in the second direction, so that the camera 231 retracts into the housing 22, the processor 22 further obtains the third induction signal sent by the Hall sensor 50 when the camera 231 is in the stretching-out position, and calculates a difference between the third induction signal and a steady-state signal. The processor 24 further determines whether an absolute value of the difference is greater than the reference threshold. When the absolute value of the difference is not greater than the reference threshold, the processor 24 controls the driving assembly 232 to work, so as to drive the second body 20 to move in the second direction, so that the camera 231 retracts into the housing 22. When the absolute value of the difference is greater than the reference threshold, the processor 24 controls the mobile terminal 200 to send prompt information to prompt the user to stay away from the external magnet.

The following describes an example of how the processor 24 of the mobile terminal 200 determines the specific situation when the trigger operation input by the user is received.

Figure 13:
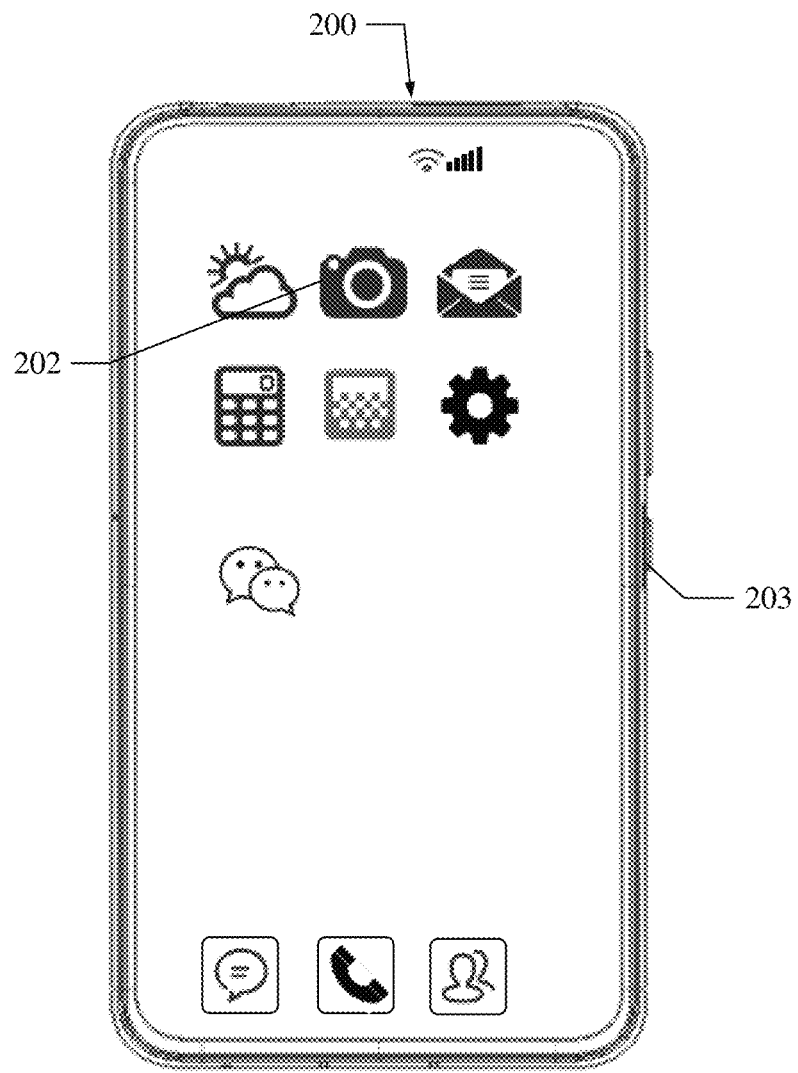
FIG. 13 is a schematic diagram of an application scenario of a mobile terminal.

One situation is shown in FIG. 13, and this situation is described by using an example in which the mobile terminal 200 is a mobile phone. When a camera application corresponding to the camera device 23 is installed on the mobile terminal 200 shown in this embodiment, an interface of the mobile terminal 200 can display a first icon 202 of the camera application. The camera application includes application software capable of using the camera device 23, such as WeChat or QQ. When the processor 24 of the mobile terminal 200 detects that the first icon 202 of the camera application receives a click event input by the user, the processor 24 controls the mobile terminal 200 to enter a shooting interface. The processor 24 controls the driving member 2321 to drive the lead screw 2323 to rotate, so that the camera 231 stretches out of the housing 22 from the opening 221 to reach the preset shooting position and is in the stretching-out position.

Figure 14:
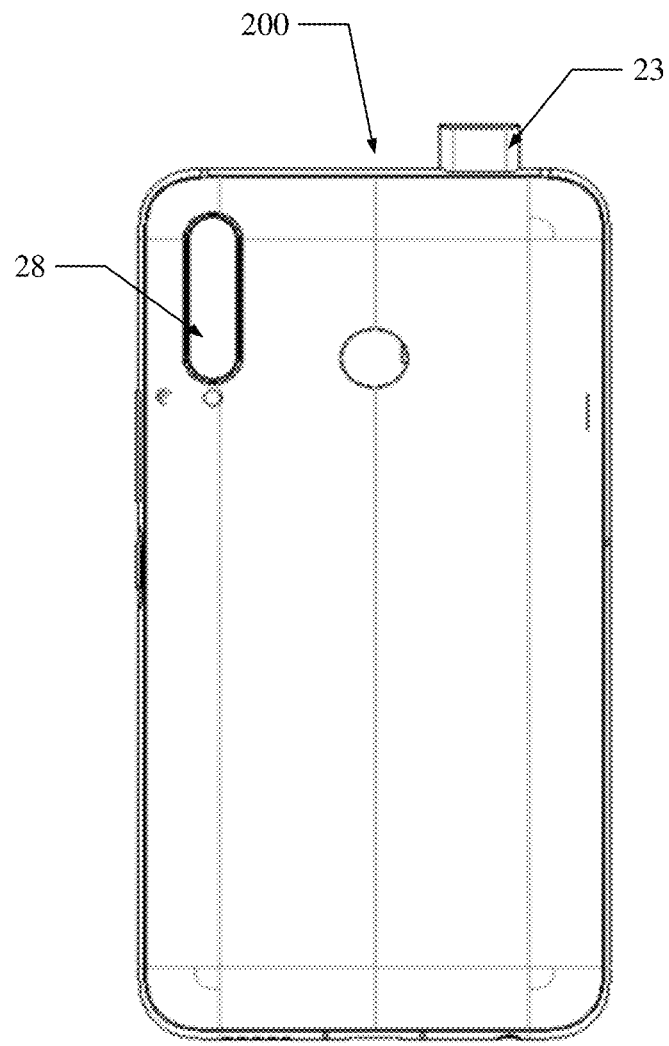
FIG. 14 is a schematic rear view of a mobile terminal according to another embodiment of this application.
Figure 15:
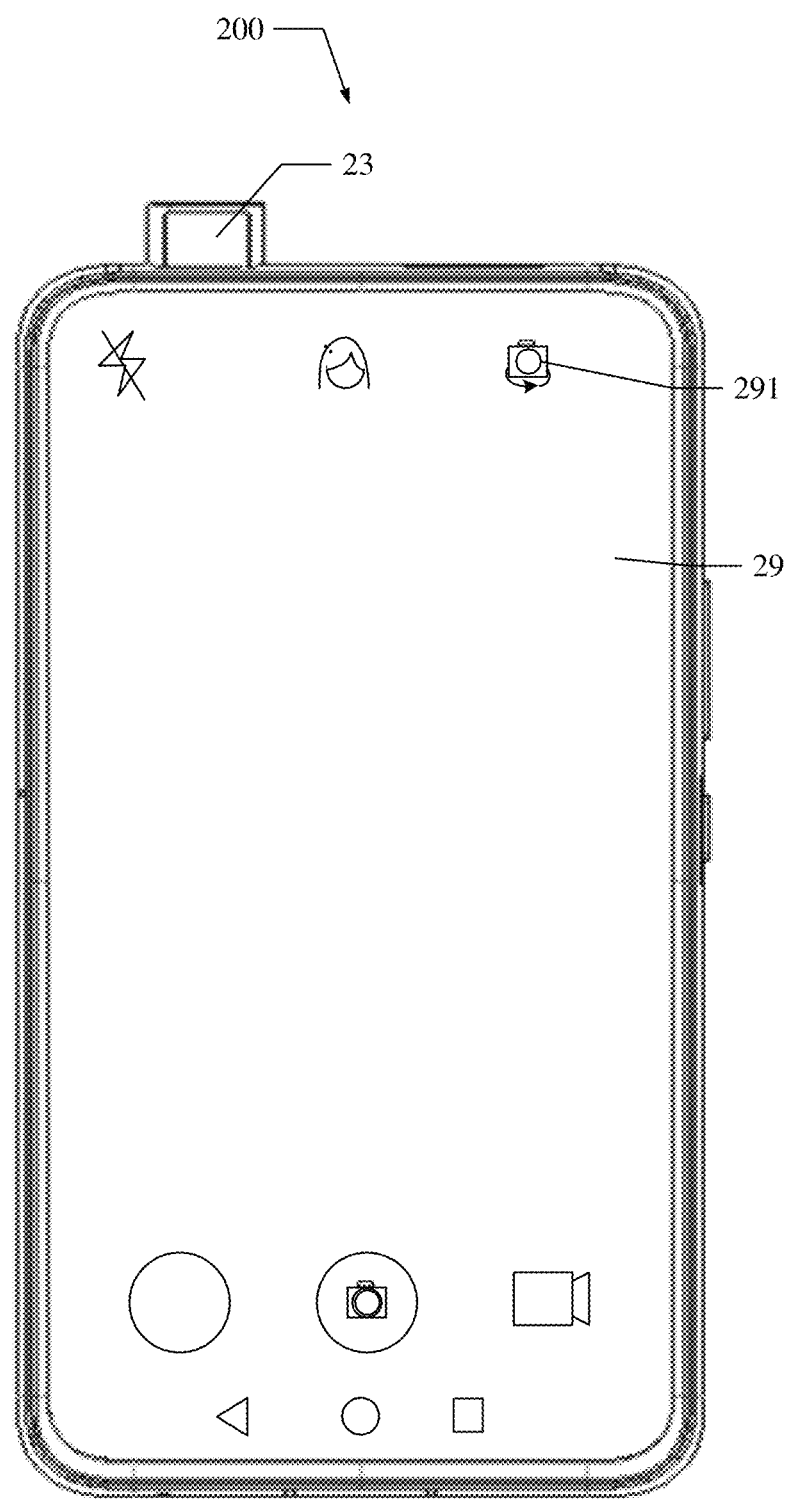
FIG. 15 is a schematic diagram of an application scenario of the mobile terminal shown in FIG. 14.

One situation is shown in FIG. 14, and this situation is described by using an example in which the mobile terminal 200 is a mobile phone. The mobile terminal 200 includes a first camera device and a second camera device 28. The first camera device is the foregoing camera device 23 that can stretch out of or retract into the housing 22 from the opening 221 in this application. The second camera device 28 is fixedly embedded on the back of the mobile terminal 200 and used as a rear camera device. When a camera application is mounted on the mobile terminal 200 shown in this application, and when the processor 24 of the mobile terminal 200 detects that the first icon 202 of the camera application receives a click event input by the user (similar to the interface of the mobile terminal shown in FIG. 13), referring to FIG. 15, the processor 24 controls the mobile terminal 200 to enter a shooting interface 29, and the shooting interface 29 includes a second icon 291. In this embodiment, the second icon 291 is an application icon for switching a working camera device. When the processor 24 detects that the second icon 291 receives a click event input by the user, the processor 24 controls the switching of the camera device to be used. For example, the second camera device 28 currently used by the mobile terminal 200 is switched to the first camera device, or the first camera device currently used by the mobile terminal 200 is switched to the second camera device 28.

For example, the processor 24 controls the mobile terminal 200 to enter the shooting interface 29, and the content displayed is an image obtained by the second camera device 28, that is, the camera device currently working on the mobile terminal 200 is the second camera device 28. When the processor 24 detects that the second icon 291 receives a click event input by the user, the processor 24 controls the turn-off of the second camera device 28 and switches to the first camera device to work. For another example, the processor 24 controls the mobile terminal 200 to enter the shooting interface 29, and the content displayed is an image obtained by the first camera device, that is, the camera device currently working on the mobile terminal 200 is the first camera device. When the processor 24 detects that the second icon 291 receives a click event input by the user, the processor 24 controls the turn-off of the first camera device so that the first camera device retracts into the housing 22, and switches to the second camera device 28 to work.

Further referring to FIG. 13, the mobile terminal 200 may be provided with a plurality of physical buttons 203. In an embodiment, one of the physical buttons 203 is a startup button of the camera device 23. When detecting a trigger event of the user on the startup button, the processor 24 controls the startup or turn-off of the camera device 23. In an embodiment, when the processor 24 of the mobile terminal 200 detects a trigger event of the user on one of the physical buttons, the processor 24 controls the startup of the camera device 23.

It should be noted that in this application, the application of the position detection mechanism 100 to the mobile terminal 200 is only an application example. Clearly, the position detection mechanism 100 may alternatively be applied to another structure (for example, a gastroscope probe), and is not limited to the mobile terminal 200.

Figure 16:
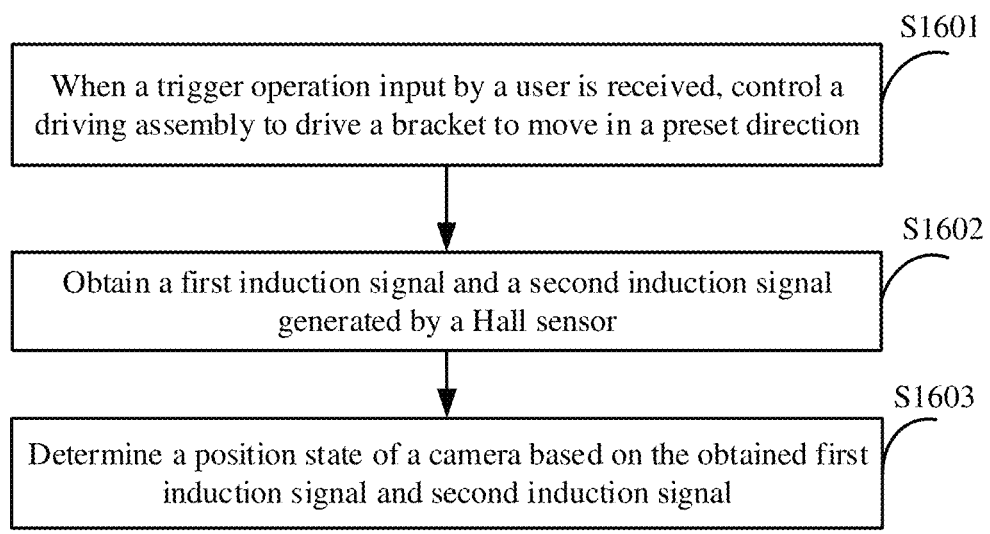
FIG. 16 is a flowchart of a position detection method according to an embodiment of this application.

FIG. 16 is a flowchart of a position detection method according to an embodiment of this application. The position detection method is applied to the mobile terminal 200 shown in FIG. 3. The position detection method includes the following steps:

Step S1601: When a trigger operation input by a user is received, control the driving assembly 232 to drive the bracket to move in a preset direction.

The preset direction includes a first direction or a second direction. The trigger operation input by the user includes a trigger operation for starting the camera 231 or a trigger operation for turning off the camera 231. For example, when the trigger operation input by the user for starting the camera 231 is received, the driving assembly 232 is controlled to work, so as to drive the bracket to move in the first direction, and drive the camera 231 to stretch out of the housing 22. Alternatively, when the trigger operation input by the user for turning off the camera 231 is received, the driving assembly 232 is controlled to work, so as to drive the bracket to move in the second direction opposite to the first direction, and drive the camera 231 to retract into the housing 22.

Step S1602: Obtain a first induction signal and a second induction signal generated by the Hall sensor 50.

The first induction signal is an induction signal generated by sensing a magnetic field of the first magnet by a first working surface a of the Hall sensor 50. The second induction signal is an induction signal generated by sensing the magnetic field of the first magnet by a second working surface b of the Hall sensor 50.

Step S1603: Determine a position state of the camera 231 based on the obtained first induction signal and second induction signal. The position state of the camera 231 includes a stretching-out position and a retracting position.

According to the position detection method in this embodiment of this application, the position state of the camera 231 is determined based on the obtained first induction signal and second induction signal, that is, the position state of the camera 231 is determined jointly by two induction signals, thereby improving the accuracy of detecting the position state of the camera 231.

Figure 17:
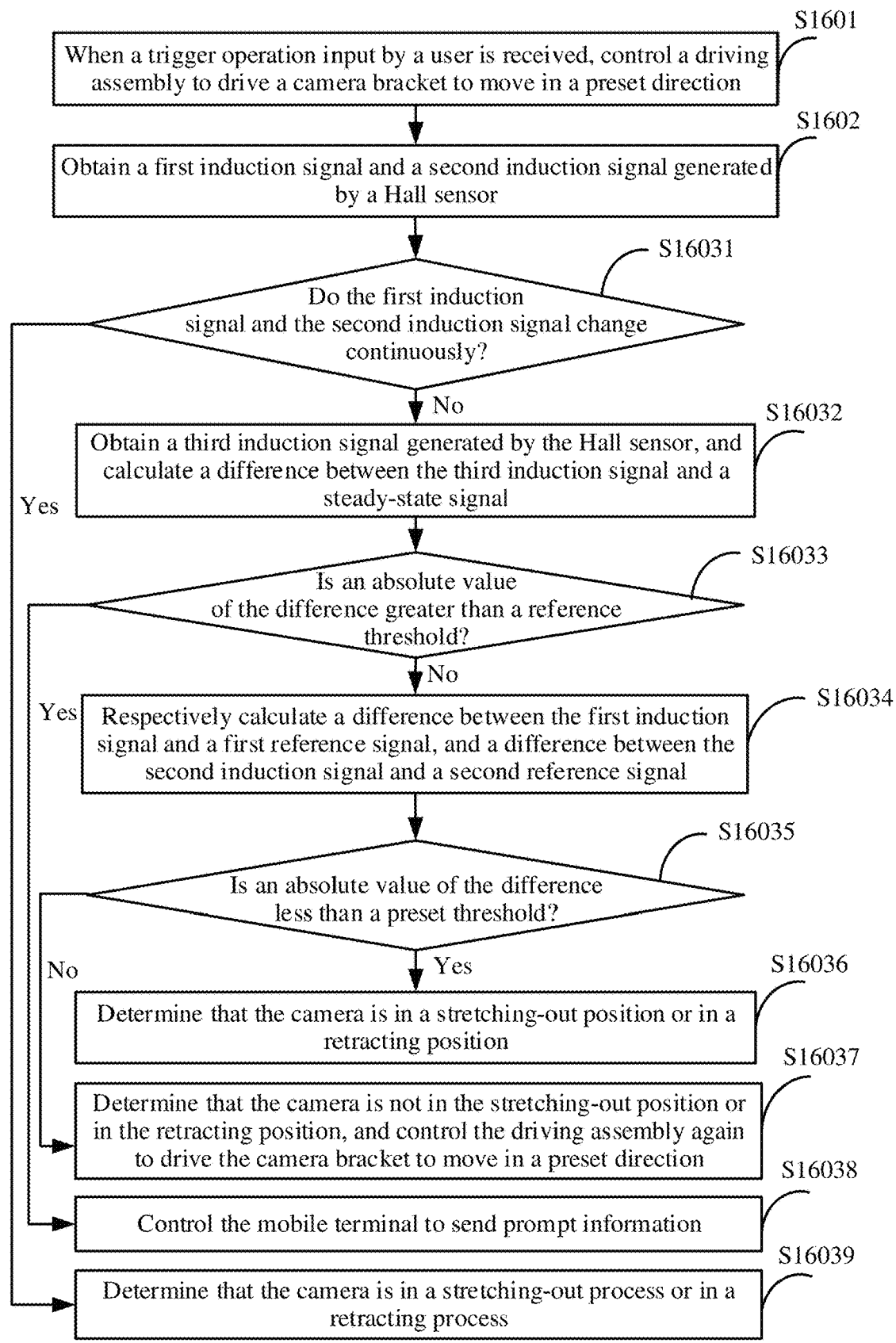
FIG. 17 is a sub-flowchart of step S1603 in FIG. 16.

FIG. 17 is a sub-flowchart of step S1603 in FIG. 16. In some embodiments, step S1603 specifically includes the following steps:

Step S16031: Determine whether the first induction signal and the second induction signal change continuously. If yes, step S11039 is performed. If no, step S11032 is performed.

Step S16032: Obtain a third induction signal generated by the Hall sensor, and calculate a difference between the obtained third induction signal and a steady-state signal.

The third induction signal is an induction signal generated by sensing the magnetic field of the first magnet 30 by a third working surface c of the Hall sensor 50. The steady-state signal is an induction signal generated by the third working surface c of the Hall sensor 50 in an environment in which the mobile terminal 200 is not subject to an external magnetic field.

Step S16033: Determine whether an absolute value of the difference is greater than a reference threshold. If yes, step S16034 is performed. If no, step S16038 is performed.

Step S16034: Respectively calculate a difference between the first induction signal and a first reference signal, and a difference between the second induction signal and a second reference signal.

The first reference signal and the second reference signal are respectively induction signals generated by the first working surface a and the second working surface b of the Hall sensor 50 when the camera 231 is in the stretching-out position. Alternatively, the first reference signal and the second reference signal are respectively induction signals generated by the first working surface a and the second working surface b of the Hall sensor 50 when the camera 231 is in the retracting position.

Step S16035: Determine whether the absolute value of the difference is less than a preset threshold. If yes, step S16036 is performed. If no, step S16037 is performed.

Step S16036: Determine that the camera 231 is in the stretching-out position or in the retracting position.

Step S16037: Determine that the camera 231 is not in the stretching-out position or in the retracting position, and control the driving assembly again to drive the bracket to move in a preset direction.

Step S16038: Control the mobile terminal 200 to send prompt information.

Step S16039: Determine that the camera 231 is in the stretching-out process or in the retracting process.

Figure 18:
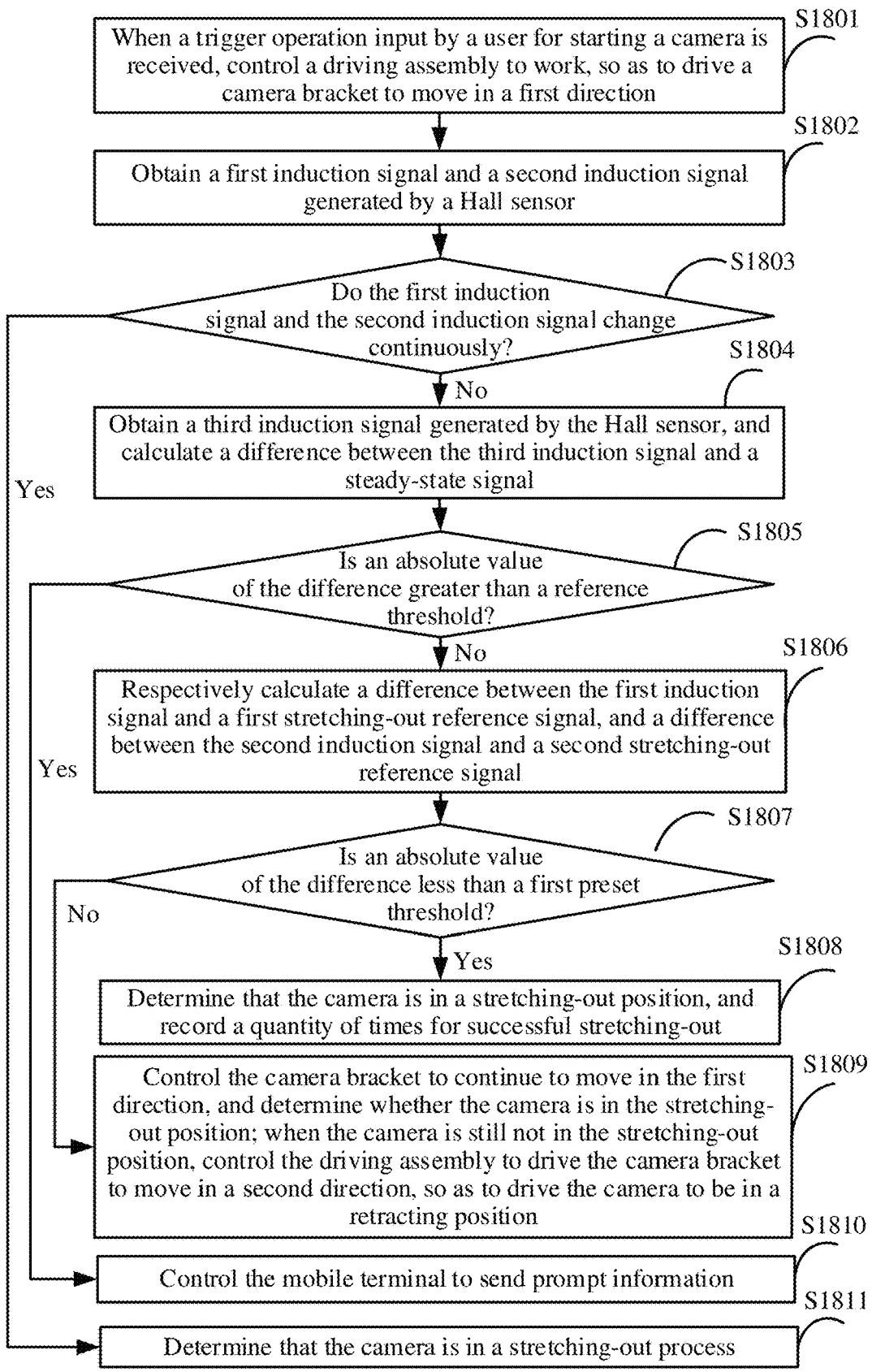
FIG. 18 is a flowchart of a position detection method according to another embodiment of this application.

FIG. 18 is a flowchart of a position detection method according to another embodiment of this application. In some embodiments, the trigger operation input by the user includes a trigger operation for starting the camera; the first reference signal includes a first stretching-out reference signal, and the second reference signal includes a second stretching-out reference signal; the preset threshold includes a first preset threshold. The first stretching-out reference signal and the second stretching-out reference signal are respectively induction signals generated by the first working surface a and the second working surface b of the Hall sensor 50 when the camera 231 is in the stretching-out position. The position detection method includes the following steps:

Step S1801: When a trigger operation input by the user for starting the camera 231 is received, control the driving assembly 232 to drive the bracket to move in a first direction.

Step S1802: Obtain a first induction signal and a second induction signal generated by the Hall sensor 50.

Step S1803: Determine whether the first induction signal and the second induction signal change continuously. If yes, step S1811 is performed. If no, step S1804 is performed.

Step S1804: Obtain a third induction signal generated by the Hall sensor, and calculate a difference between the obtained third induction signal and a steady-state signal.

The third induction signal is an induction signal generated by sensing the magnetic field of the first magnet 30 by a third working surface c of the Hall sensor 50. The steady-state signal is an induction signal generated by the third working surface c of the Hall sensor 50 in an environment in which the mobile terminal 200 is not subject to an external magnetic field.

Step S1805: Determine whether an absolute value of the difference is greater than a reference threshold. If yes, step S1809 is performed. If no, step S1806 is performed.

Step S1806: Respectively calculate a difference between the first induction signal and a first stretching-out reference signal, and a difference between the second induction signal and a second stretching-out reference signal.

Step S1807: Determine whether an absolute value of the difference is less than the first preset threshold. If yes, step S1808 is performed. If no, step S1809 is performed.

Step S1808: Determine that the camera is in the stretching-out position, and record a quantity of times for successful stretching-out.

In some embodiments, the step of recording the quantity of times for successful stretching-out may be omitted.

Step S1809: Control the bracket to continue to move in the first direction, and determine whether the camera 231 is in the stretching-out position; when the camera 231 is still not in the stretching-out position, control the driving assembly 232 to drive the bracket to move in the second direction, so as to drive the camera 231 to be in the retracting position.

Step S1810: Control the mobile terminal 200 to send prompt information.

Step S1811: Determine that the camera 231 is in the stretching-out process.

Figure 19:
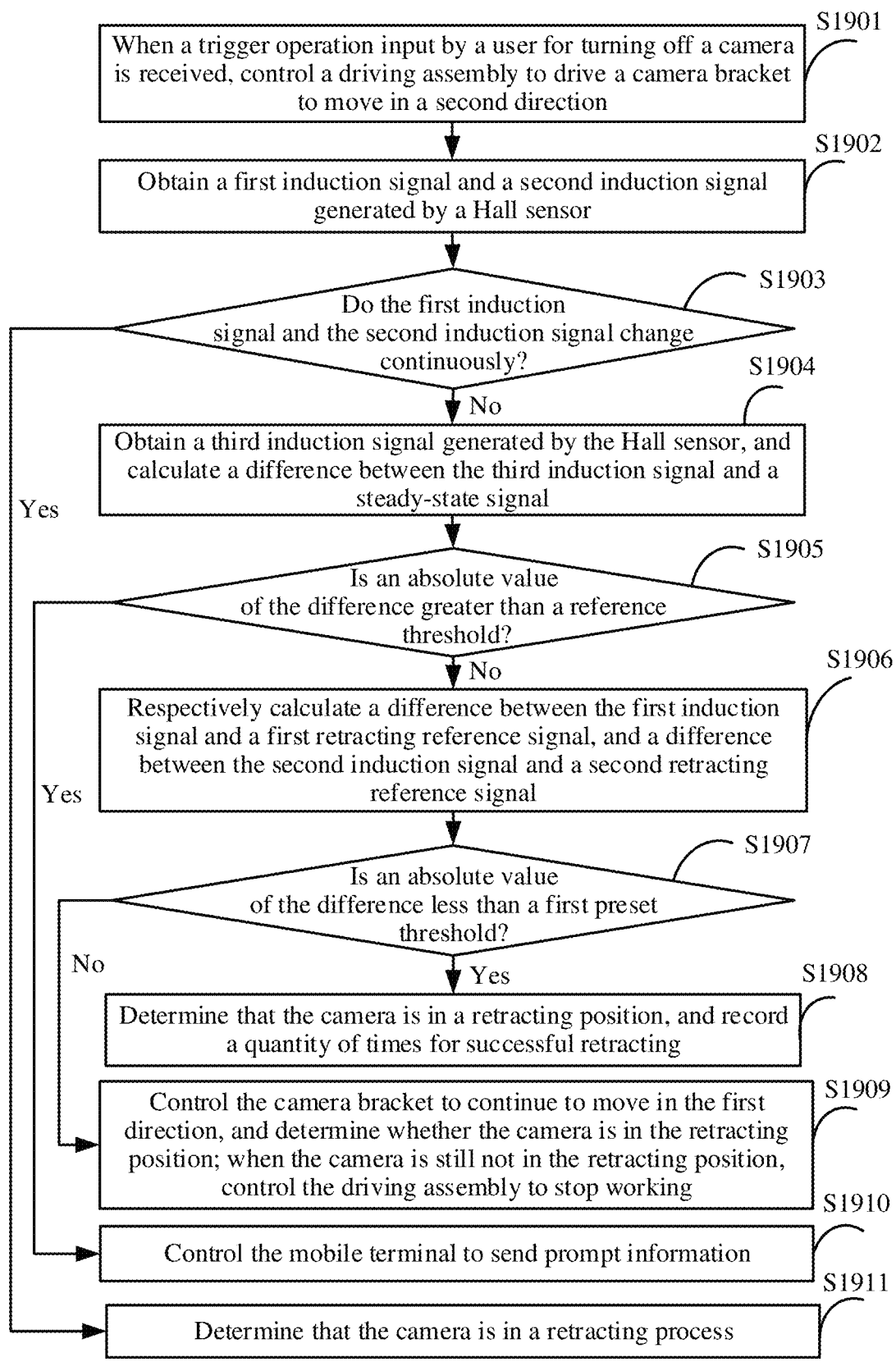
FIG. 19 is a flowchart of a position detection method according to still another embodiment of this application.

FIG. 19 is a flowchart of a position detection method according to another embodiment of this application. In some embodiments, the trigger operation input by the user includes a trigger operation for turning off the camera; the first reference signal includes a first retracting reference signal, and the second reference signal includes a second retracting reference signal; the preset threshold includes a second preset threshold. The first retracting reference signal and the second retracting reference signal are respectively induction signals generated by the first working surface a and the second working surface b of the Hall sensor 50 when the camera 231 is in the retracting position. The position detection method includes the following steps:

Step S1901: When a trigger operation input by the user for turning off the camera 231 is received, control the driving assembly 232 to drive the bracket to move in a second direction.

Step S1902: Obtain a first induction signal and a second induction signal generated by the Hall sensor 50.

Step S1903: Determine whether the first induction signal and the second induction signal change continuously. If yes, step S1911 is performed. If no, step S1904 is performed.

Step S1904: Obtain a third induction signal generated by the Hall sensor, and calculate a difference between the obtained third induction signal and a steady-state signal.

The third induction signal is an induction signal generated by sensing the magnetic field of the first magnet 30 by a third working surface c of the Hall sensor 50. The steady-state signal is an induction signal generated by the third working surface c of the Hall sensor 50 in an environment in which the mobile terminal 200 is not subject to an external magnetic field.

Step S1905: Determine whether an absolute value of the difference is greater than a reference threshold. If yes, step S1909 is performed. If no, step S1906 is performed.

Step S1906: Respectively calculate a difference between the first induction signal and a first retracting reference signal, and a difference between the second induction signal and a second retracting reference signal.

Step S1907: Determine whether an absolute value of the difference is less than the second preset threshold. If yes, step S1908 is performed. If no, step S1909 is performed.

Step S1908: Determine that the camera 231 is in the retracting position, and record a quantity of times for successful retracting.

In some embodiments, the step of recording the quantity of times for successful retracting may be omitted.

Step S1909: Control the bracket to continue to move in the second direction, and determine whether the camera 231 is in the retracting position; when the camera 231 is still not in the retracting position, control the driving assembly 232 to stop working.

Step S1910: Control the mobile terminal 200 to send prompt information.

Step S1911: Determine that the camera 231 is in the retracting process.

Figure 20:
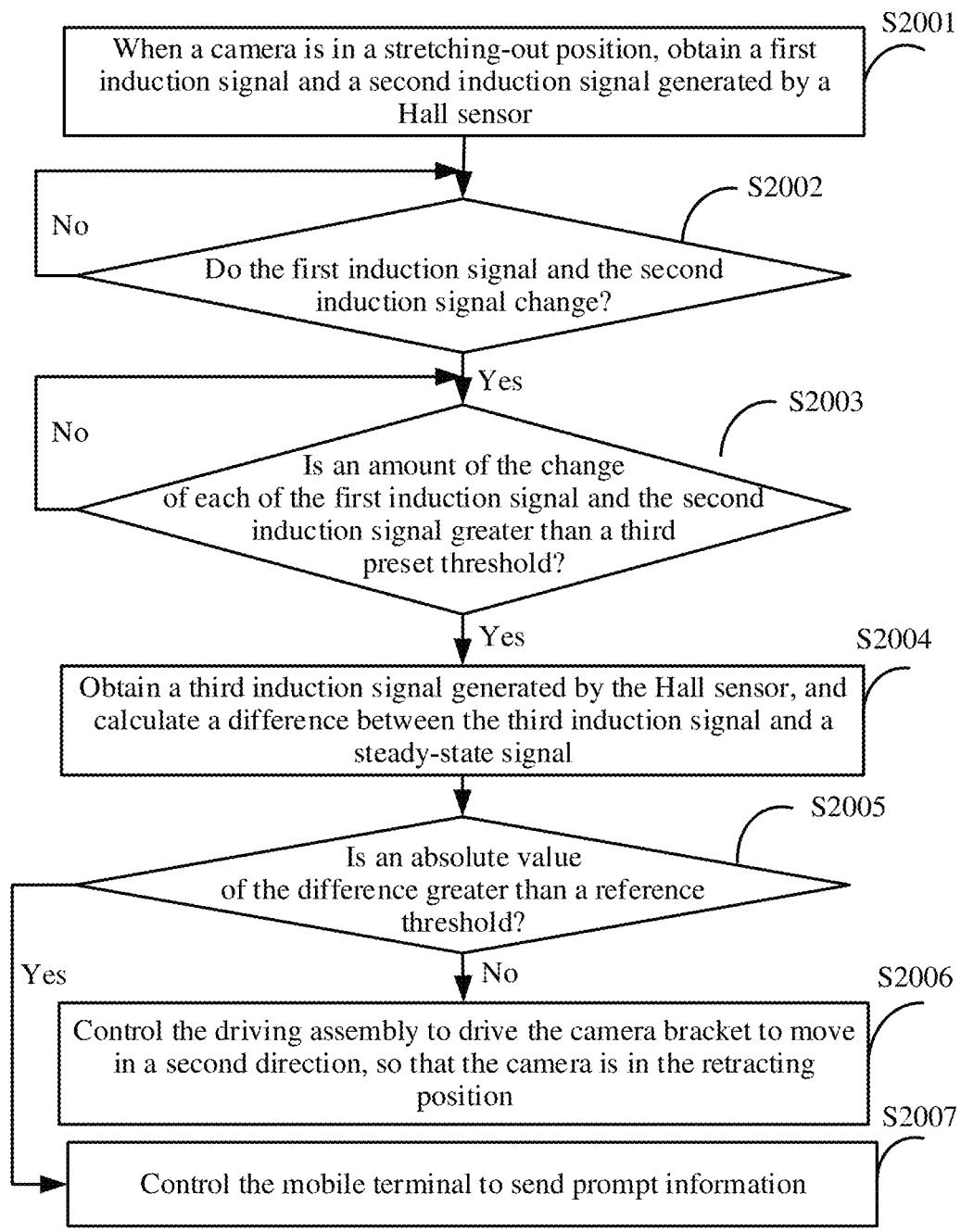
FIG. 20 is a flowchart of a position detection method according to yet another embodiment of this application.

FIG. 20 is a flowchart of a position detection method according to still another embodiment of this application. In some embodiments, the position detection method includes the following steps:

Step S2001: When the camera 231 is in the stretching-out position, obtain a first induction signal and a second induction signal generated by the Hall sensor 50.

Step S2002: Determine whether the first induction signal and the second induction signal change. If yes, step S2003 is performed. If no, step S2002 is performed.

Step S2003: Determine whether an amount of the change of each of the first induction signal and the second induction signal is greater than a third preset threshold. If yes, step S2004 is performed. If no, step S2003 is performed.

Step S2004: Obtain a third induction signal generated by the Hall sensor, and calculate a difference between the obtained third induction signal and a steady-state signal.

The third induction signal is an induction signal generated by sensing the magnetic field of the first magnet 30 by a third working surface c of the Hall sensor 50. The steady-state signal is an induction signal generated by the third working surface c of the Hall sensor 50 in an environment in which the mobile terminal 200 is not subject to an external magnetic field.

Step S2005: Determine whether an absolute value of the difference is greater than a reference threshold. If yes, step S2007 is performed. If no, step S2006 is performed.

Step S2006: Control the driving assembly 232 to drive the bracket to move in the second direction, so that the camera 231 is in the retracting position.

Step S2007: Control the mobile terminal 200 to send prompt information.

It should be noted that, for brief description, the foregoing method embodiments are represented as a combination of a series of actions. However, a person skilled in the art should appreciate that this application is not limited to the described order of the actions, because according to this application, some steps may be performed in other orders or simultaneously.

In the foregoing embodiments, descriptions of the embodiments have respective focuses. For a part that is not described in detail in an embodiment, refer to related descriptions in other embodiments.

A sequence of the steps of the method in the embodiments of this application may be adjusted, combined, or removed based on an actual requirement.

The position detection method provided in this application may be implemented in hardware or firmware, or may be used as software or computer code that can be stored in a computer-readable storage medium such as a read-only memory (ROM), a random access memory (RAM), a floppy disk, a hard disk, or a magneto-optical disc, or may be used as computer code that is originally stored on a remote recording medium or a non-transitory machine-readable medium, downloaded through a network, and stored in a local recording medium. Therefore, the method described herein may be presented by using a general-purpose computer, a special processor, or software stored on a recording medium in programmable or dedicated hardware such as an application-specific integrated circuit (ASIC) or a field programmable gate array (FPGA). As can be understood in the art, a computer, a processor, a microprocessor, a controller, or programmable hardware includes a memory component such as a RAM, a ROM, or a flash memory. When the computer, the processor, or the hardware accesses and executes the software or the computer code to implement the processing method described herein, the memory component can store or receive the software or the computer code. In addition, when a general-purpose computer accesses code for implementing the processing shown herein, the execution of the code transforms the general-purpose computer into a dedicated computer for performing the processing shown herein.

The computer-readable storage medium may be a solid-state memory, a memory card, an optical disc, or the like. The computer-readable storage medium stores a program instruction. The program instruction is invoked by a computer, a mobile phone, a tablet computer, or a mobile terminal in this application to perform the position detection method shown in FIG. 16 to FIG. 20.

The foregoing descriptions are implementations of the embodiments of this application. It should be noted that a person of ordinary skill in the art may make some improvements and polishing without departing from the principle of the embodiments of this application and the improvements and polishing shall fall within the protection scope of this application.

What is claimed is:

1. An electronic device, comprising:
 a display screen;
 a housing;
 a camera device; and
 a position detection component;
 wherein:
 the display screen is mounted on the housing;
 the housing is provided with an opening and is formed with an accommodating cavity in communication with the opening to accommodate the camera device;
 the position detection component is arranged in the accommodating cavity;
 the position detection component comprises a circuit board, a bracket, a first magnet, and a Hall sensor;

the camera device comprises a camera and a driving assembly, wherein the camera is arranged on the bracket, and the driving assembly is connected to the bracket for driving the bracket to move to drive the camera to stretch out of or retract into the housing;

the Hall sensor is arranged on the circuit board, wherein the Hall sensor comprises a first working surface and a second working surface respectively extending in different directions;

the driving assembly comprises a driving member, an adapter, and a lead screw;

one end of the adapter is fixedly connected to the bracket, and the other end of the adapter is rotatably connected to the lead screw;

the lead screw is further rotatably connected to the driving member; and the driving member drives the lead screw to rotate, so that the adapter drives the bracket to move, and the camera stretches out of or retracts into the housing from the opening.

2. The electronic device of claim 1, wherein moving directions of the first working surface and the bracket are substantially perpendicular, wherein the second working surface and the first working surface are substantially perpendicular, and wherein the second working surface and the first working surface are both substantially perpendicular to a surface of the circuit board facing the display screen.

3. The electronic device of claim 1, wherein the Hall sensor further comprises a third working surface, wherein an extension direction of the third working surface is different from an extension direction of the first working surface and is different from an extension direction of the second working surface.

4. The electronic device of claim 3, wherein the third working surface is substantially parallel to a surface of the circuit board facing the display screen.

5. The electronic device of claim 3, wherein the electronic device further comprises:
a processor electrically connected to the driving assembly and the Hall sensor;
wherein the processor is configured to:
obtain a third induction signal generated by sensing a magnetic field of the first magnet by the third working surface of the Hall sensor; and
determine, based on the third induction signal, whether the electronic device is interfered by an external magnetic field.

6. The electronic device of claim 1, wherein the position detection component further comprises a second magnet, wherein the second magnet and the first magnet are spaced apart on the bracket.

7. The electronic device of claim 6, wherein a line formed between a center point of the first magnet and a center point of the second magnet is substantially parallel to a moving direction of the bracket.

8. The electronic device of claim 6, wherein a north-south axis of the first magnet and a north-south axis of the second magnet are substantially parallel to the moving direction of the bracket.

9. The electronic device of claim 8, wherein adjacent ends of the first magnet and the second magnet have a same polarity.

10. The electronic device of claim 1, wherein the electronic device further comprises:
a processor electrically connected to the driving assembly and the Hall sensor;
wherein in response to a trigger operation input is received, the processor is configured to:
control the driving assembly to drive the bracket to move;
obtain a first induction signal generated by sensing a magnetic field of the first magnet by the first working surface of the Hall sensor and a second induction signal generated by sensing the magnetic field of the first magnet by the second working surface of the Hall sensor; and
determine a position state of the camera based on the first induction signal and the second induction signal.

11. A position detection method, the method comprising:
controlling, by an electronic device, a driving assembly to drive a bracket to move in a preset direction in response to a trigger operation being received, wherein:
the electronic device comprises a housing, a circuit board, the bracket, and a camera device,
the circuit board, the bracket, and the camera device are arranged in the housing,
the housing is provided with an opening and is formed with an accommodating cavity in communication with the opening to accommodate the camera device,
the camera device comprises a camera and the driving assembly,
the camera is arranged on the bracket,
the driving assembly is connected to the bracket,
the circuit board is provided with a Hall sensor, and
the bracket is provided with a first magnet;
obtaining, by the electronic device, a first induction signal and a second induction signal generated by the Hall sensor, wherein the first induction signal is an induction signal generated by sensing a magnetic field of the first magnet by a first working surface of the Hall sensor, and the second induction signal is an induction signal generated by sensing the magnetic field of the first magnet by a second working surface of the Hall sensor; and
determining, by the electronic device, a position state of the camera based on the first induction signal and the second induction signal, wherein the position state of the camera comprises a stretching-out position and a retracting position, wherein the determining the position state of the camera comprises:
determining whether the first induction signal and the second induction signal change continuously;
in response to the first induction signal and the second induction signal no longer changing, calculating a first difference between the first induction signal and a first reference signal, and calculating a second difference between the second induction signal and a second reference signal,
wherein the first reference signal and the second reference signal are induction signals generated by the first working surface and the second working surface of the Hall sensor, respectively, in response to the camera being in the stretching-out position; or
wherein the first reference signal and the second reference signal are induction signals generated by the first working surface and the second working surface of the Hall sensor, respectively, in response to the camera being in the retracting position;
determining whether an absolute value of the first difference and an absolute value of the second difference is less than a preset threshold; and in response to the absolute value of the first difference or the absolute value of the second difference being less than the preset threshold, determining that the camera is in the stretching-out position or in the retracting position.

12. The method of claim 11, further comprising:
in response to the first induction signal and the second induction signal changing continuously:
  determining that the camera is in a stretching-out process of extending toward the stretching-out position; or
  determining that the camera is in a retracting process of extending toward the retracting position.

13. The method of claim 11, wherein before calculating the first difference and calculating the second difference, the method further comprises:
obtaining a third induction signal generated by the Hall sensor, and calculating a third difference between the third induction signal and a steady-state signal, wherein the third induction signal is an induction signal generated by sensing the magnetic field of the first magnet by a third working surface of the Hall sensor, and the steady-state signal is an induction signal generated by the third working surface of the Hall sensor in an environment in which the electronic device is not subject to an external magnetic field;
determining whether an absolute value of the third difference is greater than a reference threshold; and
in response to the absolute value of the third difference not being greater than the reference threshold, calculating the first difference between the first induction signal and the first reference signal, and calculating the second difference between the second induction signal and the second reference signal.

14. The method of claim 11, wherein:
the trigger operation input comprises a trigger operation for starting the camera;
the first reference signal comprises a first stretching-out reference signal, and the second reference signal comprises a second stretching-out reference signal;
the preset threshold comprises a first preset threshold;
the first stretching-out reference signal and the second stretching-out reference signal are induction signals generated by the first working surface and the second working surface of the Hall sensor, respectively, in response to the camera being in the stretching-out position;
the controlling, in response to the trigger operation being received, the driving assembly to drive the bracket to move in a preset direction comprises: in response to the trigger operation input for starting the camera being received, controlling the driving assembly to drive the bracket to move in the first direction;
the calculating the first difference between the first induction signal and a first reference signal, and calculating the second difference between the second induction signal and a second reference signal comprises: respectively calculating the first difference between the first induction signal and the first stretching-out reference signal, and the second difference between the second induction signal and the second stretching-out reference signal;
the determining whether an absolute value of the first difference is less than a preset threshold comprises: determining whether the absolute value of the first difference is less than the first preset threshold; and
the determining that the camera is in the stretching-out position or in the retracting position in response to the absolute value of the first difference being less than the preset threshold comprises: in response to the absolute value of the first difference being less than the first preset threshold, determining that the camera is in the stretching-out position.

15. The method of claim 14, further comprising:
in response to the absolute value of the difference not being less than the first preset threshold, controlling the bracket to continue to move in the first direction, and determining whether the camera is in the stretching-out position;
in response to the camera still not being in the stretching-out position, controlling the bracket to move in the second direction, so that the camera is in the retracting position.

16. The method of claim 11, wherein:
the trigger operation comprises a trigger operation for turning off the camera;
the first reference signal further comprises a first retracting reference signal, and the second reference signal further comprises a second retracting reference signal;
the preset threshold further comprises a second preset threshold;
the first retracting reference signal and the second retracting reference signal are induction signals generated by the first working surface and the second working surface of the Hall sensor, respectively, in response to the camera being in the retracting position;
the controlling, in response to a trigger operation being received, the driving assembly to drive the bracket to move in a preset direction comprises: in response to a trigger operation for turning off the camera being received, controlling the driving assembly to drive the bracket to move in the second direction;
the calculating the first difference between the first induction signal and a first reference signal, and calculating the second difference between the second induction signal and a second reference signal further comprises: calculating the first difference between the first induction signal and the first retracting reference signal, and calculating the second difference between the second induction signal and the second retracting reference signal;
the determining whether an absolute value of the second difference is less than a preset threshold further comprises: determining whether the absolute value of the second difference is less than the second preset threshold; and
the determining that the camera is in the stretching-out position or in the retracting position in response to the absolute value of the second difference being less than the preset threshold further comprises: in response to the absolute value of the second difference being less than the second preset threshold, determining that the camera is in the retracting position.

17. A position detection method, the method comprising:
controlling, by an electronic device, a driving assembly to drive a bracket to move in a preset direction in response to a trigger operation being received, wherein:
  the electronic device comprises a housing, a circuit board, the bracket, and a camera device,
  the circuit board, the bracket, and the camera device are arranged in the housing, the housing is provided with an opening and is formed with an accommodating cavity in communication with the opening to accommodate the camera device, the camera device comprises a camera and the driving assembly, the camera is arranged on the bracket, the driving assembly is connected to the bracket, the circuit board is provided with a Hall sensor, and the bracket is provided with a first magnet;

obtaining, by the electronic device, a first induction signal and a second induction signal generated by the Hall sensor, wherein the first induction signal is an induction signal generated by sensing a magnetic field of the first magnet by a first working surface of the Hall sensor, and the second induction signal is an induction signal generated by sensing the magnetic field of the first magnet by a second working surface of the Hall sensor;

determining, by the electronic device, a position state of the camera based on the first induction signal and the second induction signal, wherein the position state of the camera comprises a stretching-out position and a retracting position;

in response to the camera being in the stretching-out position, obtaining, by the electronic device, a first induction signal and a second induction signal generated by the Hall sensor;

determining, by the electronic device, whether the first induction signal and the second induction signal change;

in response to the first induction signal and the second induction signal changing, determining, by the electronic device, whether an amount of the change of the first induction signal and the second induction signal is greater than a third preset threshold; and in response to the amount of the change of the first induction signal and the second induction signal being greater than the third preset threshold, controlling, by the electronic device, the driving assembly to drive the bracket to move in the second direction, so that the camera is in the retracting position.

18. The method of claim 17, wherein before the step of controlling the driving assembly to drive the bracket to move in the second direction, so that the camera is in the retracting position, the method further comprises:

obtaining a third induction signal generated by the Hall sensor, and calculating a third difference between the third induction signal and a steady-state signal, wherein the third induction signal is generated by sensing the magnetic field of the first magnet by a third working surface of the Hall sensor, and the steady-state signal is an induction signal generated by the third working surface of the Hall sensor in an environment in which the electronic device is not subject to an external magnetic field;

determining whether an absolute value of the third difference is greater than a reference threshold; and in response to the absolute value of the difference not being greater than the reference threshold, controlling the driving assembly to drive the bracket to move in the second direction, so that the camera is in the retracting position.

* * * * *

UNITED STATES PATENT AND TRADEMARK OFFICE
CERTIFICATE OF CORRECTION

| | | |
|---|---|---|
| PATENT NO. | : 11,877,047 B2 | Page 1 of 1 |
| APPLICATION NO. | : 17/442777 | |
| DATED | : January 16, 2024 | |
| INVENTOR(S) | : Wang et al. | |

It is certified that error appears in the above-identified patent and that said Letters Patent is hereby corrected as shown below:

On the Title Page

Column 1, Applicant (71): "Honor Device Co., Ltd., Guangdong (CN)" should read -- Honor Device Co., Ltd., Shenzhen (CN) --.

Signed and Sealed this
Twentieth Day of February, 2024

Katherine Kelly Vidal
*Director of the United States Patent and Trademark Office*